(12) United States Patent
Dunaway

(10) Patent No.: US 7,220,801 B2
(45) Date of Patent: May 22, 2007

(54) METALLOCENE-PRODUCED VERY LOW DENSITY POLYETHYLENES OR LINEAR LOW DENSITY POLYETHYLENES AS IMPACT MODIFIERS

(75) Inventor: David B. Dunaway, Houston, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 151 days.

(21) Appl. No.: 10/480,570

(22) PCT Filed: Jun. 11, 2002

(86) PCT No.: PCT/US02/18688

§ 371 (c)(1),
(2), (4) Date: Dec. 12, 2003

(87) PCT Pub. No.: WO03/000790

PCT Pub. Date: Jan. 3, 2003

(65) Prior Publication Data

US 2004/0152842 A1 Aug. 5, 2004

Related U.S. Application Data

(60) Provisional application No. 60/330,481, filed on Jun. 22, 2001.

(51) Int. Cl.
*C08L 23/04* (2006.01)
*C08L 23/14* (2006.01)
*C08L 23/16* (2006.01)
*B29B 39/14* (2006.01)
*B29B 41/24* (2006.01)

(52) U.S. Cl. ............... 525/240; 264/166; 264/167; 264/171.1; 264/172.19

(58) Field of Classification Search ............. 525/240; 264/166, 167, 171.1, 171.26, 172.19, 171, 264/26
See application file for complete search history.

(56) References Cited

U.S. PATENT DOCUMENTS

| | | | |
|---|---|---|---|
| 4,460,755 A | 7/1984 | Williams et al. | |
| 4,540,753 A | 9/1985 | Cozewith et al. | |
| 4,542,199 A | 9/1985 | Kaminsky et al. | |
| 4,543,399 A | 9/1985 | Jenkins, III et al. | |
| 4,588,790 A | 5/1986 | Jenkins, III et al. | |
| 4,752,597 A | 6/1988 | Turner | |
| 4,808,561 A | 2/1989 | Welborn, Jr. | |
| 4,871,705 A | 10/1989 | Hoel | |
| 4,892,851 A | 1/1990 | Ewen et al. | |
| 4,933,149 A | 6/1990 | Rhee et al. | |
| 5,017,714 A | 5/1991 | Welborn, Jr. | |
| 5,026,798 A | 6/1991 | Canich | |
| 5,028,670 A | 7/1991 | Chinh et al. | |
| 5,055,438 A | 10/1991 | Canich | |
| 5,057,475 A | 10/1991 | Canich et al. | |
| 5,064,802 A | 11/1991 | Stevens et al. | |
| 5,089,321 A * | 2/1992 | Chum et al. ............. | 428/218 |
| 5,120,867 A | 6/1992 | Welborn, Jr. | |
| 5,124,418 A | 6/1992 | Welborn, Jr. | |
| 5,132,262 A | 7/1992 | Rieger et al. | |
| 5,153,157 A | 10/1992 | Hlatky et al. | |
| 5,178,960 A | 1/1993 | Cook | |
| 5,198,401 A | 3/1993 | Turner et al. | |
| 5,206,075 A | 4/1993 | Hodgson, Jr. | |
| 5,241,025 A | 8/1993 | Hlatky et al. | |

(Continued)

FOREIGN PATENT DOCUMENTS

EP 426 638 5/1991

(Continued)

OTHER PUBLICATIONS

Rudin, Alfred, The Elements of Polymer Science and Engineering, Second Edition, 1999, Academic Press, pp. 113,462-464.*

(Continued)

*Primary Examiner*—Nathan M. Nutter

(57) ABSTRACT

In one embodiment, the present invention is directed to an article, such as a blow-molded bottle, formed from a polymer blend composition. In one aspect, the article is formed by blow-molding techniques. In one aspect, the article is a blow-molded container having a Bruceton Mean Drop Height of 3.8 feet or above. In another aspect, the article is a blow-molded container having a volume of 60 fluid ounces or greater. In general, the polymer blend composition comprises polypropylene and an impact modifier of metallocene-produced very low density polyethylene or linear low density polyethylene. In one embodiment, the polypropylene polymer comprises a random copolymer. In one embodiment the metallocene-catalyzed linear very low density polyethylene polymer has one or more of the following: (a) a density of less than 0.916 $g/cm^3$, (b) a composition distribution breadth index of 50 to 85% by weight, (c) a molecular weight distribution Mw/Mn of 2.0 to 3.0, (d) a molecular weight distribution Mz/Mw of less than 2.0, and (e) two peaks in a TREF measurement. In one embodiment, the polymer blend composition comprises 5% to 85% of the impact modifier and 95% to 15% of the polypropylene polymer, based on the total combined weight of the polypropylene polymer and the impact modifier. In another embodiment, the polymer blend composition comprises 5% to 35% of the impact modifier and 95% to 65% of the polypropylene polymer, based on the total combined weight of the polypropylene polymer and the impact modifier.

24 Claims, No Drawings

U.S. PATENT DOCUMENTS

| | | | |
|---|---|---|---|
| 5,243,001 A | 9/1993 | Winter et al. | |
| 5,264,405 A | 11/1993 | Canich | |
| 5,268,230 A | 12/1993 | Edwards | |
| 5,272,236 A | 12/1993 | Lai et al. | 526/348.5 |
| 5,278,119 A | 1/1994 | Turner et al. | |
| 5,278,264 A | 1/1994 | Spaleck et al. | |
| 5,278,272 A | 1/1994 | Lai et al. | 526/348.5 |
| 5,296,434 A | 3/1994 | Karl et al. | |
| 5,304,614 A | 4/1994 | Winter et al. | |
| 5,324,800 A | 6/1994 | Welborn, Jr. et al. | |
| 5,334,677 A | 8/1994 | Razavi et al. | |
| 5,350,723 A | 9/1994 | Neithamer et al. | |
| 5,352,749 A | 10/1994 | DeChellis et al. | |
| 5,358,792 A | 10/1994 | Mehta et al. | 428/516 |
| 5,376,439 A | 12/1994 | Hodgson et al. | 428/220 |
| 5,387,568 A | 2/1995 | Ewen et al. | |
| 5,387,630 A | 2/1995 | Edwards et al. | |
| 5,391,629 A | 2/1995 | Turner et al. | |
| 5,405,922 A | 4/1995 | DeChellis et al. | |
| 5,416,228 A | 5/1995 | Ewen et al. | |
| 5,436,304 A | 7/1995 | Griffin et al. | |
| 5,449,651 A | 9/1995 | Reddy et al. | |
| 5,453,471 A | 9/1995 | Bernier et al. | |
| 5,462,999 A | 10/1995 | Griffin et al. | |
| 5,569,693 A | 10/1996 | Doshi et al. | |
| 5,681,523 A | 10/1997 | Cobler et al. | 264/565 |
| 5,712,352 A | 1/1998 | Brant et al. | |
| 5,763,543 A | 6/1998 | Muhle et al. | |
| 5,846,620 A | 12/1998 | Compton | 428/35.7 |
| 6,087,291 A | 7/2000 | Speca et al. | |
| 6,403,717 B1 | 6/2002 | Adams et al. | 525/191 |
| 6,444,302 B1* | 9/2002 | Srinivas et al. | 428/315.5 |
| 6,747,114 B2* | 6/2004 | Karandinos et al. | 526/348.2 |
| 2003/0175538 A1* | 9/2003 | Yamaguchi et al. | 428/515 |

FOREIGN PATENT DOCUMENTS

| | | |
|---|---|---|
| EP | 427 697 | 5/1991 |
| EP | 495 375 | 7/1992 |
| EP | 500 944 | 9/1992 |
| EP | 520 732 | 12/1992 |
| EP | 570 982 | 11/1993 |
| EP | 612 768 | 8/1994 |
| EP | 881 233 | 12/1998 |
| EP | 890 581 | 1/1999 |
| EP | 1072643 | 1/2001 |
| WO | WO 91/09882 | 7/1991 |
| WO | WO 93/03093 | 2/1993 |
| WO | WO 93/14132 | 7/1993 |
| WO | WO 94/03506 | 2/1994 |
| WO | WO9406859 | 3/1994 |
| WO | WO 94/26816 | 11/1994 |
| WO | WO 96/02244 | 2/1996 |
| WO | WO 96/11960 | 4/1996 |
| WO | WO 96/11961 | 4/1996 |
| WO | WO 96/23010 | 8/1996 |
| WO | WO9837139 | 8/1998 |
| WO | WO 98/40374 | 9/1998 |
| WO | WO 98/40420 | 9/1998 |
| WO | WO 98/41529 | 9/1998 |
| WO | WO 98/47933 | 10/1998 |
| WO | WO 98/50392 | 11/1998 |
| WO | WO 99/14250 | 3/1999 |
| WO | WO 00/02930 | 1/2000 |
| WO | WO 00/02931 | 1/2000 |
| WO | WO0011078 | 3/2000 |

OTHER PUBLICATIONS

Pigeon, Michael G. et al, J. Appl. Poly. Sci., 1994, vol. 51, p. 303.*

D.W. Stephan et al., "*Remarkably Active Non-Metallocene Ethylene Polymerization Catalysts,*" Organometallics, No. 18, pp. 2046-2048, 1999.

J.A. Ewen et al., "*Syndiospecific Propylene Polymerizations with Group 4 Metallocenes,*" J. Am. Chem. Soc., No. 110, pp. 6255-6256, 1988.

L. Wild et al.,"*Determination of Branching Distributions in Polyethylene and Ethylene Copolymers,*" Journal of Polymer Science, Polymer Physics Edition, vol. 20, pp. 441-455, 1982.

Ouano A. C. et al., "*Chapter 6 Gel Permeation Chromatography,*" Marcel Dekker, Inc., Ny, pp. 287-368, 1975.

Rodriguez, F., "*Principles of Polymer Systems Third Edition,*" Hemisphere Publishing Corporation, NY, pp. 155-160, 1989.

G. Ver Strate et al., "*Near Monodisperse Ethylene-Propylene Copolymers by Direct Ziegler-Natta Polymerization, Prepartion, Characterization, Properties,*" Macromolecules, vol. 21, pp. 3360-3371, 1988.

Robert B. Anderson, "*Experpmental Methods in Catalytic Research,*" Academic Press, pp. 67-99, 1968.

W.B. Innes, "*Total Porosity and Particle Density of Fluid Catalysts by Liquid Titration,*" Analytical Chemistry, vol. 28, No. 3, pp. 332-334, Mar. 1956.

* cited by examiner

METALLOCENE-PRODUCED VERY LOW DENSITY POLYETHYLENES OR LINEAR LOW DENSITY POLYETHYLENES AS IMPACT MODIFIERS

CROSS REFERENCE TO RELATED APPLICATIONS

This application is a National Stage Application of International Application No. PCT/US02/18688, filed Jun. 11, 2002, which claims the benefit of Provisional Application No. 60/330,481, filed Jun. 22, 2001.

1. FIELD OF THE INVENTION

The present invention relates generally to polyolefin blend compositions and products produced from the polyolefin blend compositions. More specifically, the present invention is directed to polyolefin blend compositions of polypropylene and an impact modifier of metallocene-produced very low density polyethylene or linear low density polyethylene, and the products formed from such polyolefin blend compositions, such as blow-molded bottles.

2. BACKGROUND

Various types of polyethylenes are known in the art. Low density polyethylene ("LDPE") can be prepared at high pressure using free radical initiators, or in gas phase processes using Ziegler-Natta or vanadium catalysts, and typically has a density in the range of 0.916–0.940 g/cm$^3$. LDPE is also known as "branched" or "heterogeneously branched" polyethylene because of the relatively large number of long chain branches extending from the main polymer backbone. Polyethylene in the same density range, i.e., 0.916 to 0.940 g/cm$^3$, which is linear and does not contain long chain branching is also known; this "linear low density polyethylene" ("LLDPE") can be produced with conventional Ziegler-Natta catalysts or with metallocene catalysts. Relatively higher density LDPE, typically in the range of 0.928 to 0.940 g/cm$^3$, is sometimes referred to as medium density polyethylene ("MDPE"). Polyethylenes having still greater density are the high density polyethylenes ("HDPEs"), i.e., polyethylenes having densities greater than 0.940 g/cm$^3$, and are generally prepared with Ziegler-Natta catalysts. Very low density polyethylene ("VLDPE") is also known. VLDPEs can be produced by a number of different processes yielding polymers with different properties, but can be generally described as polyethylenes having a density less than 0.916 g/cm$^3$, typically 0.890 to 0.915 g/cm$^3$ or 0.900 to 0.915 g/cm$^3$.

U.S. Pat. Nos. 5,272,236 and 5,278,272 disclose polyethylenes termed "substantially linear ethylene polymers" ("SLEPs"). These SLEPs are characterized as having a polymer backbone substituted with about 0.01 long chain branches/1000 carbons to about 3 long chain branches/1000 carbons, more preferably from about 0.01 long chain branches/1000 carbons to about 1 long chain branches/1000 carbons, and especially from about 0.05 long chain branches/1000 carbons to about 1 long chain branches/1000 carbons. As used herein and in U.S. Pat. Nos. 5,272,236 and 5,278,272, a polymer with "long chain branching" is defined as one having a chain length of at least about 6 carbons, above which the length cannot be distinguished using $^{13}$C NMR spectroscopy. It is further disclosed that the long chain branch can be as long as about the same length as the length of the polymer backbone. As used in the present disclosure, the term "linear" is applied to a polymer that has a linear backbone and does not have long chain branching; i.e., a "linear" polymer is one that does not have the long chain branches characteristic of an SLEP polymer.

Polypropylene exhibits several advantageous properties, such as excellent clarity. As a consequence, polypropylene has many uses, especially in making blow-molded bottles. However, polypropylene products have poor impact strength. Polyethylenes and/or plastomers have been used as impact modifiers of polypropylenes to improve the impact resistance of polypropylenes. However, articles produced by these blends exhibit one or more of the following characteristics: poor impact strength, poor clarity, high cost of manufacturing, poor processing characteristics, high cost, and/or other undesirable properties. Accordingly, a need exists for an improved blend composition, particularly one having properties desirable in the making of blow-molded containers.

Other background references include WO 00/11078, WO 98/37139, WO 94/06859 and EP 1 072 643 A.

3. SUMMARY

In one embodiment, the present invention is directed to an article, such as a bottle, formed from a polymer blend composition. In one aspect, the article is formed by blow-molding techniques. In one aspect, the article is a blow-molded container having a Bruceton Mean Drop Height of at least 3 feet or at least 3.5 feet or at least 3.8 feet or at least 4.5 feet or at least 4.8 feet or at least 5 feet. In another aspect, the article is a blow-molded container having a volume of at least 60 fluid ounces (1.78 L) or at least 90 fluid ounces (2.66 L).

In general, the polymer blend composition comprises polypropylene and an impact modifier of metallocene-produced very low density polyethylene or linear low density polyethylene. In one embodiment, the polypropylene polymer comprises a random copolymer. In one embodiment, the very low density polyethylene polymer comprises an ethylene copolymer with a comonomer content of 25% or less by weight, preferably 20% or less by weight, and more preferably 15% or less by weight. In one embodiment, the metallocene-catalyzed linear very low density polyethylene polymer has one or more of the following: (a) a density of less than 0.916 g/cm$^3$, (b) a composition distribution breadth index of 50 to 85%, (c) a molecular weight distribution Mw/Mn of 2.0 to 3.0, (d) a molecular weight distribution Mz/Mw of less than 2.0, and (e) two peaks in a TREF measurement.

In one embodiment, the polymer blend composition comprises 5% to 85% by weight of the impact modifier and 95% to 15% by weight of the polypropylene polymer, based on the total combined weight of the polypropylene polymer and the impact modifier. In another embodiment, the polymer blend composition comprises 5% to 35% by weight of the impact modifier and 95% to 65% by weight of the polypropylene polymer, based on the total combined weight of the polypropylene polymer and the impact modifier.

In addition to bottles, the polymer blend composition of the present invention may also be used to form other products and articles, such as films, coatings, laminates, and other structures. The polymer blend composition may also be processed utilizing other processing techniques besides blow-molding.

4. DETAILED DESCRIPTION

The present invention relates generally to polyolefin blend compositions and products produced from the polyolefin blend compositions. More specifically, the present invention is directed to polyolefin blend compositions of polypropylene and an impact modifier of metallocene-produced very low density polyethylene or linear low density polyethylene, and the products formed from such blend compositions, such as blow-molded bottles. The blow-molded bottles formed from the polymer blend composition of the present invention show good impact strength and good clarity.

4.1 The Polypropylene Component

The polymer blend compositions of the present invention include a polypropylene polymer. As used herein, the term "polypropylene" and "PP" polymer refer to any propylene based polymer having a propylene content of at least 50 weight %. The polypropylene may be a polypropylene homopolymer, a propylene based copolymer, or combinations thereof. The polypropylene copolymer may be a random copolymer or a crystalline/semi-crystalline copolymer, such as polypropylene with either isotactic or syndiotactic regularity. In one specific embodiment, the polypropylene is preferably a random copolymer.

Comonomers that are useful in general for making the polypropylene copolymer include α-olefins, such as $C_2$ and $C_4$–$C_{20}$ α-olefins. Examples of α-olefins include, but are not limited to, ethylene, 1-butene, 1-hexene, 1-pentene, 1-octene, and 4-methyl-1-pentene. The preferred α-olefin is ethylene. The α-olefin content is preferably less than 20 weight percent, and more preferably less than 10 weight percent. The polypropylene having a certain melt flow rate may be selected depending on the type of processing method utilized.

The polypropylene may be produced using any conventional polymerization process, such as a solution, a slurry, or a gas-phase process, with any suitable catalyst, such as a Ziegler-Natta catalyst or a metallocene catalyst with any suitable reactor system, such as a single or a multiple reactor system.

In one embodiment, the polypropylene polymer has a melt flow rate (ASTM D1238, condition L) of from 0.5 dg/min to 200 dg/min, or from 0.5 dg/min to 100 dg/min. In another embodiment, the polypropylene polymer has a molecular Weight distribution of 1.5 to 10.

Although the PP polymer component of the polymer blend compositions has been discussed as a single polymer, blends of two or more such PP polymers having the properties described herein are also contemplated.

4.2 The VLDPE Component

The polymer blend compositions of the present invention may include a very low density polyethylene (VLDPE) polymer. As used herein, the terms "very low density polyethylene" polymer and "VLDPE" polymer refer to a polyethylene polymer having a density of less than 0.916 g/cm$^3$. In at least one specific embodiment, the invention includes a VLDPE polymer made using a gas phase polymerization process. As used herein, the term "gas phase polymerization" refers to polymerization of polymers from monomers in a gas fluidized bed. For example, the VLDPEs of the present invention may be made by polymerizing alpha-olefins in the presence of a metallocene catalyst under reactive conditions in a gas phase reactor having a fluidized bed and a fluidizing medium. In a preferred embodiment, the VLDPE polymer may be made by polymerization in a single reactor (as opposed to multiple reactors). As discussed in greater detail below, a variety of gas phase polymerization processes may be used. For example, polymerization may be conducted in uncondensed or "dry" mode, condensed mode, or "super-condensed mode." In a specific embodiment, the liquid in the fluidizing medium can be maintained at a level greater than 2 weight percent based on the total weight of the fluidizing medium.

The material exiting the reactor includes a very low density polyethylene (VLDPE), having density within the ranges described elsewhere herein, e.g., having a density from 0.890 to 0.915, more narrowly a density from 0.910 to 0.915, and a stream comprising unreacted monomer gases. Following polymerization, the polymer is recovered. In certain embodiments, the stream can be compressed and cooled, and mixed with feed components, whereupon a gas phase and a liquid phase are then returned to the reactor.

In a preferred aspect, the invention VLDPEs are copolymers, made from ethylene monomers together with at least one comonomer, e.g., hexene or octene. Polymers having more than two types of monomers, such as terpolymers, are also included within the term "copolymer" as used herein. For example, VLDPE terpolymers may be made, using ethylene monomer together with any two of butene, hexene and octene. For one embodiment of the VLDPE polymer comprising an ethylenelbutene copolymer, the molar ratio of butene to ethylene should be from about 0.015 to 0.035, preferably from 0.020 to 0.030. For one embodiment of the VLDPE polymer comprising an ethylene/hexene copolymer, the molar ratio of hexene to ethylene should be from about 0.015 to 0.035, preferably from 0.020 to 0.030. For one embodiment of the VLDPE polymer comprising an ethylene/octene copolymer, the molar ratio of octene to ethylene should be from about 0.015 to 0.035, preferably from 0.020 to 0.030.

The comonomers that are useful in general for making VLDPE copolymers include α-olefins, such as $C_3$–$C_{20}$ α-olefins and preferably $C_3$–$C_{12}$ α-olefins. The α-olefin comonomer can be linear or branched, and two or more comonomers can be used, if desired. Examples of suitable comonomers include linear $C_3$–$C_{12}$ α-olefins, and α-olefins having one or more $C_1$–$C_3$ alkyl branches, or an aryl group. Specific examples include propylene; 1-butene, 3-methyl-1-butene; 3,3-dimethyl-1-butene; 1-pentene; 1-pentene with one or more methyl, ethyl or propyl substituents; 1-hexene with one or more methyl, ethyl or propyl substituents; 1-heptene with one or more methyl, ethyl or propyl substituents; 1-octene with one or more methyl, ethyl or propyl substituents; 1-nonene with one or more methyl, ethyl or propyl substituents; ethyl, methyl or dimethyl-substituted 1-decene; 1-dodecene; and styrene. It should be appreciated that the list of comonomers above is merely exemplary, and is not intended to be limiting. Preferred comonomers include propylene, 1-butene, 1-pentene, 4-methyl-1-pentene, 1-hexene, 1-octene and styrene, more preferably 1-butene, 1-hexene, and 1-octene.

Although not generally preferred, other useful comonomers include polar vinyl, conjugated and non-conjugated dienes, acetylene and aldehyde monomers, which can be included in minor amounts in terpolymer compositions. Non-conjugated dienes useful as co-monomers preferably are straight chain, hydrocarbon di-olefins or cycloalkenyl-substituted alkenes, having 6 to 15 carbon atoms. Suitable non-conjugated dienes include, for example: (a) straight chain acyclic dienes, such as 1,4-hexadiene and 1,6-octadiene; (b) branched chain acyclic dienes, such as 5-methyl-1,4-hexadiene; 3,7-dimethyl-1,6-octadiene; and 3,7-dimethyl-1,7-octadiene; (c) single ring alicyclic dienes, such as 1,4-cyclohexadiene; 1,5-cyclo-octadiene and 1,7- cyclododecadiene; (d) multi-ring alicyclic fused and bridged ring dienes, such as tetrahydroindene; norbornadiene; methyl-tetrahydroindene; dicyclopentadiene (DCPD); bicyclo-(2.2.1)-hepta-2,5-diene; alkenyl, alkylidene, cycloalkenyl and cycloalkylidene norbornenes, such as 5-methylene-2-norbornene (MNB), 5-propenyl-2-norbornene, 5-isopropylidene-2-norbornene, 5-(4-cyclopentenyl)-2-norbornene, 5-cyclohexylidene-2-norbornene, and 5-vinyl-2-norbornene (VNB); and (e) cycloalkenyl-substituted alkenes, such as vinyl cyclohexene, allyl cyclohexene, vinyl dyclooctene, 4-vinyl cyclohexene, allyl cyclodecene, and vinyl cyclododecene. Of the non-conjugated dienes typically used, the preferred dienes are dicyclopentadiene, 1,4-hexadiene, 5-methylene-2-norbornene, 5-ethylidene-2-norbornene, and tetracyclo-(Δ-11,12)-5,8-dodecene. Particularly preferred diolefins are 5-ethylidene-2-norbornene (ENB), 1,4-hexadiene, dicyclopentadiene (DCPD), norbornadiene, and 5-vinyl-2-norbornene (VNB). Note that throughout this description the terms "non-conjugated diene" and "diene" are used interchangeably.

It should be appreciated that the amount of comonomer used will depend upon the desired density of the VLDPE polymer and the specific comonomers selected. In general, the comonomer may be present in an amount of 25% or less by weight, preferably 20% or less by weight and more preferably 15% or less by weight. In one embodiment, the comonomer may be present in an amount of 5% or more by weight. For a given comonomer, the density of the VLDPE polymer produced therefrom decreases as the comonomer content increases. One skilled in the art can readily determine the appropriate comonomer content appropriate to produce a VLDPE polymer having a desired density.

Metallocene catalysts are an important feature of this invention. For the purpose of this patent specification and the claims, a "metallocene catalyst" is defined to be at least one metallocene catalyst component containing one or more cyclopentadienyl moiety in combination with a transition metal. The active catalyst systems should include not only metallocene, but also an activator, such as an alumoxane or a derivative thereof (preferably MAO), an ionizing activator, a Lewis acid, or a combination thereof. The catalyst system is preferably supported on a carrier, typically an inorganic oxide or chloride or a resinous material such as polyethylene. Preferably, the catalyst system includes a metallocene component with single or multiple cyclopentadienyl components reacted with either a metal alkyl or alkoxy component or an ionic compound component. These catalysts can include partially and/or fully activated precursor compositions. The catalysts may be modified by prepolymerization or encapsulation. Specific metallocenes and catalyst systems useful in practicing the invention are disclosed in WO 96/11961 (International Application No. PCT/US95/12789) and WO 96/11960 (International Application No. PCT/US95/12737). Other non-limiting examples of metallocene catalysts and catalyst systems are discussed in U.S. Pat. Nos. 4,808,561, 5,017,714, 5,055,438, 5,064,802, 5,124,418, 5,153,157 and 5,324,800 all of the disclosures and teachings of which are incorporated by reference. Still other organometallic complexes and/or catalyst systems are described in Organometallics, 1999, 2046; PCT publications WO 96/23010, WO 99/14250, WO 98/50392, WO 98/41529, WO 98/40420, WO 98/40374, WO 98/47933; and European publications EP 0 881 233 and EP 0 890 581.

The terms "metallocene" and "metallocene catalyst precursor" as used herein mean compounds having a Group 4, 5 or 6 transition metal (M), with a cyclopentadienyl (Cp) ligand or ligands which may be substituted, at least one non-cyclopentadienyl-derived ligand (X), and zero or one heteroatom-containing ligand (Y), the ligands being coordinated to M and corresponding in number to the valence thereof. The metallocene catalyst precursors generally require activation with a suitable co-catalyst (referred to as an "activator"), in order to yield an "active metallocene catalyst", i.e., an, organometallic complex with a vacant coordination site that can coordinate, insert, and polymerize olefins. The metallocene catalyst precursor is preferably one of, or a mixture of metallocene compounds of either or both of the following types:

(1) Cyclopentadienyl (Cp) complexes which have two Cp ring systems for ligands. The Cp ligands form a sandwich complex with the metal and can be free to rotate (unbridged) or locked into a rigid configuration through a bridging group. The Cp ring ligands can be like or unlike, unsubstituted, substituted, or a derivative thereof, such as a heterocyclic ring system which may be substituted, and the substitutions can be fused to form other saturated or unsaturated rings systems such as tetrahydroindenyl, indenyl, or fluorenyl ring systems. These cyclopentadienyl complexes have the general formula

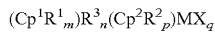

wherein: $Cp^1$ and $Cp^2$ are the same or different cyclopentadienyl rings; $R^1$ and $R^2$ are each, independently, a halogen or a hydrocarbyl, halocarbyl, hydrocarbyl-substituted organometalloid or halocarbyl-substituted organometalloid group containing up to about 20 carbon atoms; m is 0 to 5; p is 0 to 5; two $R^1$ and/or $R^2$ substituents on adjacent carbon atoms of the cyclopentadienyl ring associated therewith can be joined together to form a ring containing from 4 to about 20 carbon atoms; $R^3$ is a bridging group; n is the number of atoms in the direct chain between the two ligands and is 0 to 8, preferably 0 to 3; M is a transition metal having a valence of from 3 to 6, preferably from group 4, 5, or 6 of the periodic table of the elements and is preferably in its highest oxidation state; each X is a non-cyclopentadienyl ligand and is, independently, a hydrogen, a halogen or a hydrocarbyl, oxyhydrocarbyl, halocarbyl, hydrocarbyl-substituted organometalloid, oxyhydrocarbyl-substituted organometalloid or halocarbyl-substituted organometalloid group containing up to about 20 carbon atoms; and q is equal to the valence of M minus 2.

(2) Monocyclopentadienyl complexes which have only one Cp ring system as a ligand. The Cp ligand forms a half-sandwich complex with the metal and can be free to rotate (unbridged) or locked into a rigid configuration through a bridging group to a heteroatom-containing ligand. The Cp ring ligand can be unsubstituted, substituted, or a derivative thereof such as a heterocyclic ring system which may be substituted, and the substitutions can be fused to form other saturated or unsaturated rings systems such as tetrahydroindenyl, indenyl, or fluorenyl ring systems. The heteroatom containing ligand is bound to both the metal and optionally to the Cp ligand through the bridging group. The heteroatom itself is an atom with a coordination number of three from Group 15 or a coordination number of two from group 16 of the periodic table of the elements. These mono-cyclopentadienyl complexes have the general formula

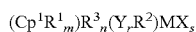

wherein: each $R^1$ is independently, a halogen or a hydrocarbyl, halocarbyl, hydrocarbyl-substituted organometalloid or halocarbyl-substituted organometalloid group containing up to about 20 carbon atoms, "m" is 0 to 5, and two $R^1$ substituents on adjacent carbon atoms of the cyclopentadienyl ring associated there with can be joined together to form a ring containing from 4 to about 20 carbon atoms; $R^3$ is a bridging group; "n" is 0 to 3; M is a transition metal having a valence of from 3 to 6, preferably from group 4, 5, or 6 of the periodic table of the elements and is preferably in its highest oxidation state; Y is a heteroatom containing group in which the heteroatom is an element with a coordination number of three from Group 15 or a coordination number of two from group 16, preferably nitrogen, phosphorous, oxygen, or sulfur; $R^2$ is a radical selected from a group consisting of $C_1$ to $C_{20}$ hydrocarbon radicals, substituted $C_1$ to $C_{20}$ hydrocarbon radicals, wherein one or more hydrogen atoms is replaced with a halogen atom, and when Y is three coordinate and unbridged there may be two $R^2$ groups on Y each independently a radical selected from the group consisting of $C_1$ to $C_{20}$ hydrocarbon radicals, substituted $C_1$ to $C_{20}$ hydrocarbon radicals, wherein one or more hydrogen atoms is replaced with a halogen atom, and each X is a non-cyclopentadienyl ligand and is, independently, a hydrogen, a halogen or a hydrocarbyl, oxyhydrocarbyl, halocarbyl, hydrocarbyl-substituted organometalloid, oxyhydrocarbyl-substituted organometalloid or halocarbyl-substituted organometalloid group containing up to about 20 carbon atoms, "s" is equal to the valence of M minus 2.

Examples of biscyclopentadienyl metallocenes of the type described in group (1) above for producing the m-VLDPE polymers of the invention are disclosed in U.S. Pat. Nos. 5,324,800; 5,198,401; 5,278,119; 5,387,568; 5,120,867; 5,017,714; 4,871,705, 4,542,199; 4,752,597; 5,132,262; 5,391,629; 5,243,001; 5,278,264; 5,296,434; and 5,304,614.

Illustrative, but not limiting, examples of suitable biscyclopentadienyl metallocenes of the type described in group (1) above are the racemic isomers of:

μ-$(CH_3)_2$Si(indenyl)$_2$M(Cl)$_2$;
μ-$(CH_3)_2$Si(indenyl)$_2$M(CH$_3$)$_2$;
μ-$(CH_3)_2$Si(tetrahydroindenyl)$_2$M(Cl)$_2$;
μ-$(CH_3)_2$Si(tetrahydroindenyl)$_2$M(CH$_3$)$_2$;
μ-$(CH_3)_2$Si(indenyl)$_2$M(CH$_2$CH$_3$)$_2$; and
μ-$(C_6H_5)_2$C(indenyl)$_2$M(CH$_3$)$_2$;

wherein M is Zr or Hf.

Examples of suitable unsymmetrical cyclopentadienyl metallocenes of the type described in group (1) above are disclosed in U.S. Pat. Nos. 4,892,851; 5,334,677; 5,416,228; and 5,449,651; and in the publication *J. Am. Chem. Soc.* 1988, 110, 6255.

Illustrative, but not limiting, examples of preferred unsymmetrical cyclopentadienyl metallocenes of the type described in group (1) above are:

μ-$(C_6H_5)_2$C(cyclopentadienyl)(fluorenyl)M(R)$_2$;
μ-$(C_6H_5)_2$C(3-methylcyclopentadienyl)(fluorenyl)M(R)$_2$;
μ-$(CH_3)_2$C(cyclopentadienyl)(fluorenyl)M(R)$_2$;
μ-$(C_6H_5)_2$C(cyclopentadienyl)(2-methylindenyl)M(CH$_3$)$_2$;
μ-$(C_6H_5)_2$C(3-methylcyclopentadienyl)(2-methylindenyl)M(Cl)$_2$;
μ-$(C_6H_5)_2$C(cyclopentadienyl)(2,7-dimethylfluorenyl)M(R)$_2$; and
μ-$(CH_3)_2$C(cyclopentadienyl)(2,7-dimethylfluorenyl)M(R)$_2$;

wherein M is Zr or Hf, and R is Cl or CH$_3$.

Examples of suitable monocyclopentadienyl metallocenes of the type described in group (2) above are disclosed in U.S. Pat. Nos. 5,026,798; 5,057,475; 5,350,723; 5,264,405; 5,055,438; and in WO 96/002244.

Illustrative, but not limiting, examples of preferred monocyclopentadienyl metallocenes of the type described in group (2) above are:

μ-$(CH_3)_2$Si(cyclopentadienyl)(1-adamantylamido)M(R)$_2$;
μ-$(CH_3)_2$Si(3-tertbutylcyclopentadienyl)(1-adamantylamido)M(R)$_2$;
μ-$(CH_2$(tetramethylcyclopentadienyl)(1-adamantylamido)M(R)$_2$;
μ-$(CH_3)_2$Si(tetramethylcyclopentadienyl)(1-adamantylamido)M(R)$_2$;
μ-$(CH_3)_2$C(tetramethylcyclopentadienyl)(1-adamantylamido)M(R)$_2$;
μ-$(CH_3)_2$Si(tetramethylcyclopentadienyl)(1-tertbutylamido)M(R)$_2$;
μ-$(CH_3)_2$Si(fluorenyl)(1-tertbutylamido)M(R)$_2$;
μ-$(CH_3)_2$Si(tetramethylcyclopentadienyl)(1-cyclododecylamido)M(R)$_2$; and
μ-$(C_6H_5)_2$C(tetramethylcyclopentadienyl)(1-cyclododecylamido)M(R)$_2$;

wherein M is Ti, Zr or Hf, and R is Cl or CH$_3$.

Other organometallic complexes that are useful catalysts for the VLDPE polymers described herein are those with diimido ligand systems, such as are described in WO 96/23010. Other references describing suitable organometallic complexes include Organometallics, 1999, 2046; PCT publications WO 99/14250, WO 98/50392, WO 98/41529, WO 98/40420, WO 98/40374, WO 98/47933; and European publications EP 0 881 233 and EP 0 890 581.

The metallocene compounds and/or other organometallic complexes are contacted with an activator to produce an active catalyst. One class of activators is noncoordinating anions, where the term "noncoordinating anion" (NCA) means an anion which either does not coordinate to the transition metal cation or which is only weakly coordinated to the transition metal cation, thereby remaining sufficiently labile to be displaced by a neutral Lewis base. "Compatible" noncoordinating anions are those which are not degraded to neutrality when the initially formed complex decomposes. Further, the anion will not transfer an anionic substituent or fragment to the cation so as to cause it to form a neutral four coordinate metallocene compound and a neutral by-product from the anion. Noncoordinating anions useful in accordance with this invention are those which are compatible, stabilize the metallocene cation in the sense of balancing its ionic charge in a +1 state, yet retain sufficient lability to permit displacement by an ethylenically or acetylenically unsaturated monomer during polymerization. Additionally, the anions useful in this invention will be large or bulky in the sense of sufficient molecular size to largely inhibit or prevent neutralization of the metallocene cation by Lewis bases other than the polymerizable monomers that may be present in the polymerization process. Typically the anion will have a molecular size of greater than or equal to about 4 angstroms.

An additional method of making metallocene catalysts uses ionizing anionic pre-cursors which are initially neutral Lewis acids but form the cation and anion upon ionizing reaction with the metallocene compounds. For example, tris(pentafluorophenyl) boron acts to abstract an alkyl, hydride or silyl ligand from the metallocene compound to yield a metallocene cation and a stabilizing non-coordinating anion; see, EP-A-0 427 697 and EP-A-0 520 732. Metallocene catalysts for addition polymerization can also be prepared by oxidation of the metal centers of transition metal compounds by anionic precursors containing metallic oxidizing groups along with the anion groups; see EP-A-0 495 375.

Examples of suitable activators capable of ionic cationization of the metallocene compounds of the invention, and consequent stabilization with a resulting noncoordinating anion, include:

trialkyl-substituted ammonium salts such as:
triethylammonium tetraphenylborate;
tripropylammonium tetraphenylborate;
tri(n-butyl)ammonium tetraphenylborate;
trimethylammonium tetrakis(p-tolyl)borate;
trimethylammonium tetrakis(o-tolyl)borate;
tributylammonium tetrakis(pentafluorophenyl)borate;
tripropylammonium tetrakis(o,p-dimethylphenyl)borate;
tributylammonium tetrakis(m,m-dimethylphenyl)borate;
tributylammonium tetrakis(p-trifluoromethylphenyl)borate;
tributylammonium tetrakis(pentafluorophenyl)borate; and
tri(n-butyl)ammonium tetrakis(o-tolyl)borate;
N,N-dialkyl anilinium salts such as:
N,N-dimethylanilinium tetrakis(pentafluorophenyl)borate;
N,N-dimethylaniliniumtetrakis(heptafluoronaphthyl)borate;
N,N-dimethylanilinium tetrakis(perfluoro-4-biphenyl)borate;
N,N-dimethylanilinium tetraphenylborate;
N,N-diethylanilinium tetraphenylborate; and
N,N-2,4,6-pentamethylanilinium tetraphenylborate;
dialkyl ammonium salts such as:
di-(isopropyl)ammonium tetrakis(pentafluorophenyl)borate; and
dicyclohexylammonium tetraphenylborate; and
triaryl phosphonium salts such as:
triphenylphosphonium tetraphenylborate;
tri(methylphenyl)phosphonium tetraphenylborate; and
tri(dimethylphenyl)phosphonium tetraphenylborate.

Further examples of suitable anionic precursors include those including a stable carbonium ion, and a compatible non-coordinating anion. These include:

tropillium tetrakis(pentafluorophenyl)borate;
triphenylmethylium tetrakis(pentafluorophenyl)borate;
benzene (diazonium) tetrakis(pentafluorophenyl)borate;
tropillium phenyltris(pentafluorophenyl)borate;
triphenylmethylium phenyl-(trispentafluorophenyl)borate;
benzene (diazonium) phenyl-tris(pentafluorophenyl)borate;
tropillium tetrakis(2,3,5,6-tetrafluorophenyl)borate;
triphenylmethylium tetrakis(2,3,5,6-tetrafluorophenyl)borate;
benzene (diazonium) tetrakis(3,4,5-trifluorophenyl)borate;
tropillium tetrakis(3,4,5-trifluorophenyl)borate;
benzene (diazonium) tetrakis(3,4,5-trifluorophenyl)borate;
tropillium tetrakis(3,4,5-trifluorophenyl)aluminate;
triphenylmethylium tetrakis(3,4,5-trifluorophenyl)aluminate;
benzene (diazonium) tetrakis(3,4,5-trifluorophenyl)aluminate;
tropillinum tetrakis(1,2,2-trifluoroethenyl)borate;
triphenylmethylium tetrakis(1,2,2-trifluoroethenyl)borate;
benzene (diazonium) tetrakis(1,2,2-trifluoroethenyl)borate;
tropillium tetrakis(2,3,4,5-tetrafluorophenyl)borate;
triphenylmethylium tetrakis(2,3,4,5-tetrafluorophenyl) borate; and
benzene (diazonium) tetrakis(2,3,4,5-tetrafluorophenyl)borate.

Where the metal ligands include halide moieties, for example, (methyl-phenyl) silylene(tetra-methyl-cyclopentadienyl)(tert-butyl-amido) zirconium dichloride), which are not capable of ionizing abstraction under standard conditions, they can be converted via known alkylation reactions with organometallic compounds such as lithium or aluminum hydrides or alkyls, alkylalumoxanes, Grignard reagents, etc. See EP-A-0 500 944, EP-A1-0 570 982 and EP-A1-0 612 768 for processes describing the reaction of alkyl aluminum compounds with dihalide substituted metallocene compounds prior to or with the addition of activating anionic compounds. For example, an aluminum alkyl compound may be mixed with the metallocene prior to its introduction into the reaction vessel. Since the alkyl aluminum is also suitable as a scavenger (as described below), its use in excess of that normally stoichiometrically required for akylation of the metallocene will permit its addition to the reaction solvent with the metallocene compound. Normally, alumoxane would not be added with the metallocene, so as to avoid premature activation, but can be added directly to the reaction vessel in the presence of the polymerizable monomers when serving as both scavenger and alkylating activator.

Alkylalumoxanes are additionally suitable as catalyst activators, particularly for those metallocenes having halide ligands. An alumoxane useful as a catalyst activator typically is an oligomeric aluminum compound represented by the general formula $(R—Al—O)_n$, which is a cyclic compound, or $R(R—Al—O)_nAlR_2$, which is a linear compound. In these formulae, each R or $R_2$ is a $C_1$ to $C_5$ alkyl radical, for example, methyl, ethyl, propyl, butyl or pentyl, and "n" is an integer from 1 to about 50. Most preferably, R is methyl and "n" is at least 4, i.e., methylalumoxane (MAO). Alumoxanes can be prepared by various procedures known in the art. For example, an aluminum alkyl may be treated with water dissolved in an inert organic solvent, or it may be contacted with a hydrated salt, such as hydrated copper sulfate suspended in an inert organic solvent, to yield an alumoxane. Generally, however prepared, the reaction of an aluminum alkyl with a limited amount of water yields a mixture of the linear and cyclic species of the alumoxane.

Optionally, a scavenging compound is also used. The term "scavenging compound" as used herein refers to those compounds effective for removing polar impurities from the reaction solvent. Such impurities can be inadvertently introduced with any of the polymerization reaction components, particularly with solvent, monomer and comonomer feed, and adversely affect catalyst activity and stability by decreasing or even eliminating catalytic activity, particularly when a metallocene cation-noncoordinating anion pair is the catalyst system. The polar impurities, or catalyst poisons, include water, oxygen, oxygenated hydrocarbons, metal impurities, etc. Preferably, steps are taken before provision of such into the reaction vessel, for example, by chemical treatment or careful separation techniques after or during the synthesis or preparation of the various components, but some minor amounts of scavenging compound will still normally be required in the polymerization process itself. Typically, the scavenging compound will be an organometallic compound such as the Group-13 organometallic compounds of U.S. Pat. Nos. 5,153,157 and 5,241,025; EP-A-0 426 638; WO-A-91/09882; WO-A-94/03506; and WO-A-93/14132. Exemplary compounds include triethyl aluminum, triethyl borane, tri-isobutyl aluminum, isobutyl alumimumoxane, those having bulky substituents covalently bound to the metal or metalloid center being preferred to minimize adverse interaction with the active catalyst.

The material exiting the reactor includes the VLDPE polymer and a stream containing unreacted monomer gases. Following polymerization, the polymer is recovered. In certain embodiments, the stream can be compressed and cooled, and mixed with feed components, whereupon a gas phase and a liquid phase are then returned to the reactor.

Generally, in carrying out the gas phase polymerization processes described herein, the reactor temperature can be in the range of about 50° C. to about 110° C., sometimes higher. However, the reactor temperature should not exceed the melting point of the VLDPE being formed. An illustrative reactor temperature is about 80° C. The reactor pressure should be 100 to 1000 psig, preferably about 150 to 600 psig, more preferably 200 to about 500 psig and most preferably between 250 to 400 psig.

Preferably, the process is operated in a continuous cycle. A specific, non-limiting embodiment of the gas phase polymerization process that is operated in a continuous cycle will now be described, it being understood that other forms of gas polymerization may also be used.

A gaseous stream containing one or more monomers is continuously passed through the fluidized bed under reactive conditions in the presence of a metallocene catalyst. This gaseous stream is withdrawn from the fluidized bed and recycled back into the reactor. Simultaneously, polymer product may be withdrawn from the reactor and new monomer or monomers are added to replace the reacted monomer(s). In one part of the cycle, in a reactor, a cycling gas stream is heated by the heat of polymerization. This heat is removed in another part of the cycle by a cooling system external to the reactor. Heat generated by the reaction may be removed in order to maintain the temperature of the gaseous stream inside the reactor at a temperature below the polymer and catalyst degradation temperatures. Further, it is often desirable to prevent agglomeration or formation of chunks of polymer that cannot be removed as product. This may be accomplished in a variety of art-recognized ways, e.g., through control of the temperature of the gaseous stream in the reaction bed to a temperature below the fusion or sticking temperature of the polymer particles produced during the polymerization reaction.

Heat should be removed, since the amount of polymer produced in the fluidized bed polymerization process is generally related to the amount of heat that can be withdrawn from a reaction zone in a fluidized bed within the reactor. During the gas phase polymerization process, heat can be removed from the gaseous recycle stream by cooling the stream outside the reactor. The velocity of the gaseous recycle stream in a fluidized bed process should be sufficient to maintain the fluidized bed in a fluidized state. In certain conventional fluidized bed reactors, the amount of fluid circulated to remove the heat of polymerization is often greater than the amount of fluid required for support of the fluidized bed and for adequate mixing of the solids in the fluidized bed. However, to prevent excessive entrainment of solids in a gaseous stream withdrawn from the fluidized bed, the velocity of the gaseous stream should be regulated.

The recycle stream can be cooled to a temperature below the dew point, resulting in condensing a portion of the recycle stream, as described in U.S. Pat. No. 4,543,399 and U.S. Pat. No. 4,588,790, the disclosures of which are incorporated herein by reference to the extent not inconsistent with the present inventions. As set forth in those patents, the resulting stream containing entrained liquid should be returned to the reactor without the aforementioned agglomeration and/or plugging that may occur when a liquid is introduced during the fluidized bed polymerization process. For purposes of this patent, this intentional introduction of a liquid into a recycle stream or reactor during the process is referred to generally as a "condensed mode" operation of the gas phase polymerization process. As taught by the above mentioned patents, when a recycle stream temperature is lowered to a point below its dew point in "condensed mode." operation, an increase in polymer production is possible, as compared to production in a "non-condensing" or "dry" mode because of increased cooling capacity. Also, a substantial increase in space time yield, the amount of polymer production in a given reactor volume, can be achieved by operating in "condensed mode" with little or no change in product properties. Also, in certain "condensed mode" operations, the liquid phase of the two-phase gas/liquid recycle stream mixture remains entrained or suspended in the gas phase of the mixture. The cooling of the recycle stream to produce this two-phase mixture results in a liquid/vapor equilibrium. Vaporization of the liquid occurs when heat is added or pressure is reduced. The increase in space time yields are the result of this increased cooling capacity of the recycle stream which, in turn, is due both to the greater temperature differential between the entering recycle stream and the fluidized bed temperature and to the vaporization of condensed liquid entrained in the recycle stream. In a specific non-limiting embodiment of the process described herein for making VLDPEs with improved toughness, a "condensed mode" of operation is utilized.

In operating the gas phase polymerization process to obtain the VLDPEs of this invention, the amount of polymer and catalyst, the operating temperature of the reactor, the ratio of comonomer(s) to monomer and the ratio of hydrogen to monomer should be determined in advance, so that the desired density and melt index can be achieved.

Although a variety of gas polymerization processes may be used to make the polyolefins of the present inventions, including "non-condensed" or "dry" mode, it is preferred to use any one of a variety of "condensed mode" processes, including the condensed mode processes described in the above patents, as well as improved "condensed mode" gas polymerization processes, such as those disclosed in Griffin et al., U.S. Pat. No. 5,462,999, and U.S. Pat. No. 5,405,922, which are hereby incorporated by reference, to the extent not inconsistent with the processes disclosed herein. Other types of condensed mode processes are also applicable, including so-called "supercondensed mode" processes, as discussed in U.S. Pat. Nos. 5,352,749 and 5,436,304, both of which are fully incorporated by reference, to the extent not inconsistent with the inventions herein.

The "condensable fluids" that can be used in one of the condensed mode gas phase polymerization operations may include saturated or unsaturated hydrocarbons. Examples of suitable inert condensable fluids are readily volatile liquid hydrocarbons, which may be selected from saturated hydrocarbons containing from 2 to 8 carbon atoms. Some suitable saturated hydrocarbons are propane, n-butane, isobutane, n-pentane, isopentane, neopentane, n-hexane, isohexane, and other saturated C6 hydrocarbons, n-heptane, n-octane and other saturated C7 and C8 hydrocarbons or mixtures thereof. The preferred inert condensable hydrocarbons are C4 and C6 saturated hydrocarbons. The condensable fluids may also include polymerizable condensable comonomers such as olefins, alpha-olefins, diolefins, diolefins containing at least one alphaolefin or mixtures thereof including some of the aforementioned monomers which may be partially or entirely incorporated into the polymer product.

In any of the gas phase polymerization processes described herein, including those in the patents referenced herein, the unreacted monomers in the product stream may be recycled. Preferably, to make the VLDPEs of the invention with the desired density, the composition of the recycle stream should be carefully controlled so that the proper ratio of comonomers is maintained, as discussed above.

The density of the polyethylene having the improved properties of this invention ranges from the lower limits of 0.890 g/cm$^3$, 0.900 g/cm$^3$, 0.905 g/cm$^3$, 0.910 g/cm$^3$ or 0.911 g/cm$^3$ to the upper limits of 0.915 g/cm$^3$ or 0.913 g/cm$^3$. Throughout this specification and in the appended claims, it is understood that density values are expressed in g/cm$^3$. Density values were determined using chips cut from plaques compression molded in accordance with ASTM D-1928-96 Procedure C, aged in accordance with ASTM D618 Procedure A, and measured according to ASTM DI 505-96.

The VLDPE polymer is further characterized by a melt index (MI) of from 0.5 to 50 g/10 min (dg/min), as measured in accordance with ASTM-1238 condition E. In one or more specific embodiments, alternative lower limits for the melt index include 0.7 and 1.0 g/10 min, and alternative upper limits for the melt index include 5, 10, 12, 15 and 20 g/10 min, with melt index ranging from any lower limit to, any upper limit being within the scope of the invention.

The preferred gas-phase, metallocene LDPE polymers can be further characterized by a narrow composition distribution. As is well known to those skilled in the, art, the composition distribution of a copolymer relates to the uniformity of distribution of comonomer among the molecules of the polymer. Metallocene catalysts are known to incorporate comonomer very evenly among the polymer molecules they produce. Thus, copolymers produced from a catalyst system having a single metallocene component have a very narrow composition distribution, in that most of the polymer molecules will have roughly the same comonomer content, and within each molecule the comonomer will be randomly distributed. By contrast, conventional Ziegler-Natta catalysts generally yield copolymers having a considerably broader composition distribution, with comonomer inclusion varying widely among the polymer molecules.

A measure of composition distribution is the "Composition Distribution Breadth Index" ("CDBI"). The definition of Composition Distribution Breadth Index (CDBI), and the method of determining CDBI, can be found in U.S. Pat. No. 5,206,075 and PCT publication WO 93/03093. From the weight fraction versus composition distribution curve, the CDBI is determined by establishing the weight percentage of a sample that has a comonomer content within 50% of the median comonomer content on each side of the median. The CDBI of a copolymer is readily determined utilizing well known techniques for isolating individual fractions of a sample of the copolymer. One such technique is Temperature Rising Elution Fractionation (TREF) as described in Wild, et al., *J. Poly. Sci., Poly. Phys. Ed.*, vol. 20, p. 441 (1982).

To determine CDBI, a solubility distribution curve is first generated for the copolymer. This, may be accomplished using data acquired from the TREF technique described above. This solubility distribution curve is a plot of the weight fraction of the copolymer that is solubilized as a function of temperature. This is converted to a weight fraction versus composition distribution curve. For the purpose of simplifying the correlation of composition with elution temperature, all fractions are assumed to have a Mn≧15,000, where Mn is the number average molecular weight of the fraction. Any low weight fractions present generally represent a trivial portion of the VLDPE polymers. The remainder of this description and the appended claims maintain this convention of assuming all fractions have Mn≧15,000 in the CDBI measurement.

The VLDPE polymers can also be characterized by molecular weight distribution (MWD). Molecular weight distribution (MWD) is a measure of the range of molecular weights within a given polymer sample. It is well known that the breadth of the MWD can be characterized by the ratios of various molecular weight averages, such as the ratio of the weight average molecular weight to the number average molecular weight, Mw/Mn, or the ratio of the Z-average molecular weight to the weight average molecular weight, Mz/Mw.

Mz, Mw and Mn can be measured using gel permeation chromatography (GPC), also known as size exclusion chromatography (SEC). This technique utilizes an instrument containing columns packed with porous beads, an elution solvent, and detector in order to separate polymer molecules of different sizes. In a typical measurement, the GPC instrument used is a Waters chromatograph equipped with ultrastyro gel columns operated at 145° C. The elution solvent used is trichlorobenzene. The columns are calibrated using sixteen polystyrene standards of precisely known molecular weights. A correlation of polystyrene retention volume obtained from the standards, to the retention volume of the polymer tested yields the polymer molecular weight.

Average molecular weights M can be computed from the expression:

$$M = \frac{\sum_i N_i M_i^{n+1}}{\sum_i N_i M_i^n}$$

where $N_i$ is the number of molecules having a molecular weight $M_i$. When n=0, M is the number average molecular weight Mn. When n=1, M is the weight average molecular weight Mw. When n=2, M is the Z-average molecular weight Mz. The desired MWD function (e.g., Mw/Mn or Mz/Mw) is the ratio of the corresponding M values. Measurement of M and MWD is well known in the art and is discussed in more detail in, for example, Slade, P. E. Ed., *Polymer Molecular Weights Part II*, Marcel Dekker, Inc., NY, (1975) 287–368; Rodriguez, F., *Principles of Polymer Systems* 3rd ed., Hemisphere Pub. Corp., NY, (1989) 155–160; U.S. Pat. No. 4,540,753; Verstrate et al., *Macromolecules*, vol. 21, (1988) 3360; and references cited therein.

The VLDPE polymers recited in the claims below are preferably linear polymers, i.e., without long chain branching. As used in the present disclosure, the term "linear" is applied to a polymer that has a linear backbone and does not have long chain branching; i.e., a "linear" polymer is one that does not have the long chain branches characteristic of a SLEP polymer as defined in U.S. Pat. Nos. 5,272,236 and 5,278,272. Thus, a "substantially linear" polymer as disclosed in those patents is not a "linear" polymer because of the presence of long chain branching.

Preferred VLDPE polymers have one or more of the following characteristics, in addition to the density, melt index, and other parameters described herein:

(a) a composition distribution CDBI of 50 to 85%, alternatively 60 to 80%, or 55 to 75%, or 55% or more to 70% or less;

(b) a molecular weight distribution Mw/Mn of 2 to 3, alternatively 2.2 to 2.8;

(c) a molecular weight distribution Mz/Mw of less than 2; and (d) the presence of two peaks in a TREF measurement.

Particularly, preferred VLDPEs having some or all of these characteristics are the gas phase metallocene-produced VLDPEs described above.

Two peaks in the TREF measurement as used in this specification and the appended claims means the presence of two distinct normalized ELS (evaporation mass fight scattering) response peaks in a graph of normalized ELS response (vertical or y axis) versus elution temperature (horizontal or x axis with temperature increasing from left to right) using the TREF method disclosed in the EXAMPLES section below. A "peak" in this context means where the general slope of the graph changes from positive to negative with increasing temperature. Between the two peaks is a local minimum in which the general slope of the graph changes from negative to positive with increasing temperature. "General trend" of the graph is intended to exclude the multiple local minimums and maximums that can occur in intervals of 2° C. or less. Preferably, the two distinct peaks are at least 3° C. apart, more preferably at least 4° C. apart, even more preferably at least 5° C. apart. Additionally, both of the distinct peaks occur at a temperature on the graph above 20° C. and below 120° C. where the elution temperature is run to 0° C. or lower. This limitation avoids confusion with the apparent peak on the graph at low temperature caused by material that remains soluble at the lowest elution temperature. Two peaks on such a graph indicates a bimodal composition distribution (CD). Bimodal CD may also be determined by other methods known to those skilled in the art.

A preferred balance of film properties according to the invention is achieved when the long chain branching of the VLDPE is reduced. Therefore, with respect to the catalyst structures described above, bis-Cp structures are preferred over mono-Cp structures, unbridged structures are preferred over bridged structures, and unbridged bis-Cp structures are the most preferred. Preferred catalyst systems which will minimize or eliminate long chain branching to produce polymers substantially free of or free of long chain branching are based on un-bridged bis-Cp zirconocenes, such as but not limited to bis (1-methyl-3-n-butyl cyclopentadiane) zirconium dichloride.

Symmetric metallocenes may be used to produce a VLDPE polymer of the present invention. Symmetric metallocenes include, but are not limited to:
bis(methylcyclopentadienyl)zirconium dichloride;
bis(1,3-dimethylcyclopentadienyl)zirconium dichloride;
bis(1,2-dimethylcyclopentadienyl)zirconium dichloride;
bis(1,2,4-trimethylcyclopentadienyl)zirconium dichloride;
bis(1,2,3-trimethylcyclopentadienyl)zirconium dichloride;
bis(tetramethylcyclopentadienyl)zirconium dichloride;
bis(pentamethylcyclopentadienyl)zirconium dichloride;
bis(ethylcyclopentadienyl)zirconium dichloride;
bis(propylcyclopentadienyl)zirconium dichloride;
bis(butylcyclopentadienyl)zirconium dichloride;
bis(isobutylcyclopentadienyl)zirconium dichloride;
bis(pentylcyclopentadienyl)zirconium dichloride;
bis(isopentylcyclopentadienyl)zirconium dichloride;
bis(cyclopentylcyclopentadienyl)zirconium dichloride;
bis(phenylcyclopentadienyl)zirconium dichloride;
bis(benzylcyclopentadienyl)zirconium dichloride;
bis(trimethylsilylmethylcyclopentadienyl)zirconium dichloride;
bis(cyclopropylmethylcyclopentadienyl)zirconium dichloride;
bis(cyclopentylmethylcyclopentadienyl)zirconium dichloride;
bis(cyclohexylmethylcyclopentadienyl)zirconium dichloride;
bis(propenylcyclopentadienyl)zirconium dichloride;
bis(butenylcyclopentadienyl)zirconium dichloride;
bis(1,3-ethylmethylcyclopentadienyl)zirconium dichloride;
bis(1,3-propylmethylcyclopentadienyl)zirconium dichloride;
bis(1,3-butylmethylcyclopentadienyl)zirconium dichloride;
bis(1,3-isopropylmethylcyclopentadienyl)zirconium dichloride;
bis(1,3-isobutylmethylcyclopentadienyl)zirconium dichloride;
bis(1,3-methylcyclopentylcyclopentadienyl)zirconium dichloride; and
bis(1,2,4-dimethylpropylcyclopentadienyl)zirconium dichloride.

Unsymmetric metallocenes may be used to produce a VLDPE polymer of the present invention. Unsymmetric metallocenes include, but are not limited to:
cyclopentadienyl(1,3-dimethylcyclopentadienyl)zirconium dichloride;
cyclopentadienyl(1,2,4-trimethylcyclopentadienyl)zirconium dichloride;
cyclopentadienyl(tetramethylcyclopentadienyl)zirconium dichloride;
cyclopentadienyl(pentamethylcyclopentadienyl)zirconium dichloride;
cyclopentadienyl(propylcyclopentadienyl)zirconium dichloride;
cyclopentadienyl(butylcyclopentadienyl)zirconium dichloride;
cyclopentadienyl(pentylcyclopentadienyl)zirconium dichloride;
cyclopentadienyl(isobutylcyclopentadienyl)zirconium dichloride;
cyclopentadienyl(cyclopentylcyclopentadienyl)zirconium dichloride;
cyclopentadienyl(isopentylcyclopentadienyl)zirconium dichloride;
cyclopentadienyl(benzylcyclopentadienyl)zirconium dichloride;
cyclopentadienyl(phenylcyclopentadienyl)zirconium dichloride;
cyclopentadienyl(1,3-propylmethylcyclopentadienyl)zirconium dichloride;
cyclopentadienyl(1,3-butylmethylcyclopentadienyl)zirconium dichloride;
cyclopentadienyl(1,3-isobutylmethylcyclopentadienyl)zirconium dichloride;
cyclopentadienyl(1,2,4-dimethylpropylcyclopentadienyl)zirconium dichloride;

(tetramethylcyclopentadienyl)(methylcyclopentadienyl) zirconium dichloride;
(tetramethylcyclopentadienyl)(1,3-dimethylcyclopentadienyl)zirconium dichloride;
(tetramethylcyclopentadienyl)(1,2,4-trimethylcyclopentadienyl)zirconium dichloride;
(tetramethylcyclopentadienyl)(propylcyclopentadienyl) zirconium dichloride;
(tetramethylcyclopentadienyl)(cyclopentylcyclopentadienyl)zirconium dichloride;
(pentamethylcyclopentadienyl)(methylcyclopentadienyl) zirconium dichloride;
(pentamethylcyclopentadienyl)(1,3-dimethylcyclopentadienyl)zirconium dichloride;
(pentamethylcyclopentadienyl)(1,2,4-trimethylcyclopentadienyl)zirconium dichloride;
(pentamethylcyclopentadienyl)(propylcyclopentadienyl) zirconium dichloride;
(pentamethylcyclopentadienyl)(cyclopentylcyclopentadienyl)zirconium dichloride;
cyclopentadienyl(ethyltetramentylcyclopentadienyl)zirconium dichloride;
cyclopentadienyl(propyltetramentylcyclopentadienyl)zirconium dichloride;
(methylcyclopentadienyl)(propyltetramentylcyclopentadienyl)zirconium dichloride;
(1,3-dimethylcyclopentadienyl)(propyltetramentylcyclopentadienyl) zirconium dichloride;
(1,2,4-trimethylcyclopentadienyl)(propyltetramentylcyclopentadienyl) zirconium dichloride;
(propylcyclopentadienyl)(propyltetramentylcyclopentadienyl)zirconium dichloride;
cyclopentadienyl(indenyl)zirconium dichloride;
(methylcyclopentadienyl)(indenyl)zirconium dichloride;
(1,3-dimethylcyclopentadienyl)(indenyl)zirconium dichloride;
(1,2,4-trimethylcyclopentadienyl)(indenyl)zirconium dichloride;
(tetramethylcyclopentadienyl)(indenyl)zirconium dichloride;
(pentamethylcyclopentadienyl)(indenyl)zirconium dichloride;
cyclopentadienyl(1-methylindenyl)zirconium dichloride;
cyclopentadienyl(1,3-dimethylindenyl)zirconium dichloride;
cyclopentadienyl(1,2,3-trimethylindenyl)zirconium dichloride;
cyclopentadienyl(4,7-dimethylindenyl)zirconium dichloride;
(tetramethylcylopentadienyl)(4,7-dimethylindenyl)zirconium dichloride;
(pentamethylcyclopentadienyl)(4,7-dimethylindenyl)zirconium dichloride;
cyclopentadienyl(5,6-dimethylindenyl)zirconium dichloride;
(pentamethylcyclopentadienyl)(5,6-dimethylindenyl)zirconium dichloride; and (tetramethylcyclopentadienyl)(5,6-dimethylindenyl)zirconium dichloride.

The preferred method for producing the catalyst of the invention is described below and can be found in U.S. application Ser. No. 265,533, filed Jun. 24, 1994, now abandoned, and Ser. No. 265,532, filed Jun. 24, 1994, now abandoned, both are hereto fully incorporated by reference in their entirety. In a preferred embodiment, the metallocene catalyst component is typically slurried in a liquid to form a metallocene solution and a separate solution is formed containing an activator and a liquid. The liquid can be any compatible solvent or other liquid capable of forming a solution or the like with at least one metallocene catalyst component and/or at least one activator. In the preferred embodiment the liquid is a cyclic aliphatic or aromatic hydrocarbon, most preferably toluene. The metallocene and activator solutions are preferably mixed together and added to a porous support such that the total volume of the metallocene solution and the activator solution or the metallocene and activator solution is less than four times the pore volume of the porous support, more preferably less than three times, even more preferably less than two times, and more preferably in the 1–1.5 times to 2.5–4 times range and most preferably in the 1.5 to 3 times range. Also, in the preferred embodiment, an antistatic agent is added to the catalyst preparation.

In one embodiment, the metallocene catalyst is prepared from silica dehydrated at 600° C. The catalyst is a commercial scale catalyst prepared in a mixing vessel with and agitator. An initial charge of 1156 pounds (462 kg) toluene is added to the mixer. This was followed by mixing 925 pounds (421 kg) of 30 percent by weight methyl aluminoxane in toluene. This is followed with 100 pounds (46 kg) of 20 percent by weight bis(1,3-methyl-n-butyl cyclopentadienyl) zirconium dichloride in toluene (20.4 pounds (9.3 kg) of contained metallocene). An additional 144 pounds (66 kg) of toluene is added to the mixer to rinse the metallocene feed cylinder and allowed to mix for 30 minutes at ambient conditions. This is followed by 54.3 pounds (25 kg) of an AS-990 in toluene, surface modifier solution, containing 5.3 pounds (2.4 kg) of contained AS-990. An additional 100 pounds (46 kg) of toluene rinsed the surface modifier container and was added to the mixer. The resulting slurry is vacuum dried at 3.2 psia (70.6 kPa) at 175° F. (79° C.) to a free flowing powder. The final catalyst weight was 1093 pounds (497 kg). The catalyst can have a final zirconium loading of 0.40% and an aluminum loading of 12.0%.

In one preferred embodiment a substantially homogenous catalyst system is preferred. For the purposes of this patent specification and appended claims, a "substantially homogenous catalyst" is one in which the mole ratio of the transition metal of the catalyst component, preferably with an activator, is evenly distributed throughout a porous support.

The procedure for measuring the total pore volume, of a porous support is well known in the art. Details of one of these procedures is discussed in Volume 1, Experimental Methods in Catalytic Research (Academic Press, 1968) (specifically see pages 67–96). This preferred procedure involves the use of a classical BET apparatus for nitrogen absorption. Another method well know in the art is described in Innes, Total porosity and Particle Density of Fluid Catalysts By Liquid Titration, Vol. 28, No. 3, Analytical Chemistry 332–334 (March, 1956).

The mole ratio of the metal of the activator component to the transition metal of the metallocene component is in the range of ratios between 0.3:1 to 1000:1, preferably 20:1 to 800:1, and most preferably 50:1 to 500:1. Where the activator is an ionizing activator as previously described the mole ratio of the metal of the activator component to the transition metal component is preferably in the range of ratios between 0.3:1 to 3:1. component to the transition metal component is preferably in the range of ratios between 0.3:1 to 3:1.

Typically in a gas phase polymerization process a continuous cycle is employed where in one part of the cycle of a reactor, a cycling gas stream, otherwise known as a recycle stream or fluidizing medium, is heated in the reactor by the heat of polymerization. This heat is removed in another part of the cycle by a cooling system external to the reactor. (See for example U.S. Pat. Nos. 4,543,399, 4,588,790, 5,028,670, 5,352,749, 5,405,922, 5,436,304, 5,453,471 and 5,462,999 all of which are fully incorporated herein by reference.)

Generally in a gas fluidized bed process for producing polymer from monomers a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and new or fresh monomer is added to replace the polymerized monomer.

In one embodiment of the process of the invention the process is essentially free of a scavenger. For the purposes of this patent specification and appended claims the term "essentially free" means that during the process of the invention no more than 10 ppm of a scavenger based on the total weight of the recycle stream is present at any given point in time during the process of the invention.

In another embodiment of the process of the invention the process is substantially free of a scavenger. For the purposes of this patent specification and appended claims the term "substantially free" is defined to be that during the process of the invention no more than 50 ppm of a scavenger based on the total weight of a fluidized bed is present at any given point in time during the process of the invention.

In one embodiment during reactor start-up to remove impurities and ensure polymerization is initiated, a scavenger is present in an amount less than 300 ppm, preferably less than 250 ppm, more preferably less than 200 ppm, even more preferably less than 150 ppm, still more preferably less than 100 ppm, and most preferably less than 50 ppm based on the total bed weight of a fluidized bed during the first 12 hours from the time the catalyst is placed into the reactor, preferably up to 6 hours, more preferably less than 3 hours, even more preferably less than 2 hours, and most preferably less than 1 hour and then the introduction of the scavenger is halted.

In another embodiment of the process of the invention the scavenger is present in an amount sufficient until the catalyst of the invention has achieved a catalyst productivity on a weight ratio basis of greater than 1000 grams of polymer per gram of the catalyst, preferably greater than about 1500, more preferably greater than 2000, even more preferably greater than 2500, and most preferably greater than 3000.

In another embodiment of the process of the invention during start-up the scavenger is present in an amount sufficient until the catalyst of the invention has achieved a catalyst productivity 40 percent of that of steady-state, preferably less than 30 percent, even more preferably less than 20 percent and most preferably less than 10 percent. For the purposes of this patent specification and appended claims "steady state" is the production rate, weight of polymer being produced per hour.

The productivity of the catalyst or catalyst system is influenced by the main monomer, (i.e., ethylene or propylene) partial pressure. The preferred mole percent of the monomer, ethylene or propylene, is from about 25 to 90 mole percent and the monomer partial pressure is in the range of from about 75 psia (517 kPa) to about 300 psia (2069 kPa), which are typical conditions in a gas phase polymerization process.

When a scavenger is utilized in the process of the invention the scavenger can be introduced typically into the reactor directly or indirectly into the recycle stream or into any external means capable of introducing the scavenger into the reactor. Preferably the scavenger enters into the reactor directly, and most preferably directly into the reactor bed or below the distributor plate in a typical gas phase process, preferably after the bed is in a fluidized state. In one embodiment the scavenger can be introduced once, intermittently or continuously to the reactor system.

The scavenger used in the process of the invention is introduced to the reactor at a rate equivalent to 10 ppm to 100 ppm based on the steady state, production rate, and then scavenger introduction is stopped.

In yet another embodiment particularly during start-up the scavenger when used is introduced at a rate sufficient to provide an increase in catalyst productivity on a weight ratio basis of a rate of 200 grams of polymer per gram of catalyst per minute, preferably at a rate of 300, even more preferably at a rate of 400 and most preferably at a rate of 500.

In another embodiment, the mole ratio of the metal of the scavenger to the transition metal of the metallocene catalyst component equals about, about 0.2 multiplied by the ppm of a scavenger based on the production rate multiplied by the catalyst productivity in kilograms of polymer per gram of catalyst. The range of the mole ratio is from about 300 to 10. In a preferred embodiment, where an alkyl aluminum is used as the scavenger the mole ratio is represented as aluminum (Al) to transition metal, for example, zirconium, where the moles of. Al are based on the total amount of scavenger used.

It is also preferred that hydrogen hot be added to the system simultaneously with the scavenger. It is also within the scope of this invention that the scavenger can be introduced on a carrier separate from that used when a supported metallocene catalyst system is used in the process of the invention.

Fines for the purpose of this patent specification and appended claims are polymer particles less than 125 μm in size. Fines of this size can be measured by using a standard 120 mesh unit sieve screen. In a preferred embodiment the amount of scavenger present in the reactor at any given point in time during the process of the invention the level of fines less than 125 μm is less than 10%, preferably less than 1%, more preferably less than 0.85% to less than 0.05%.

It is within the scope of the invention that a system external to the reactor for removing scavengers introduced in the process of the invention from the recycle stream may be used. This would then prevent the recycle of the scavenger back into the reactor and prevent scavenger build-up in the reactor system. It is preferred that such a system is placed prior to the heat exchanger or compressor in the recycle stream line. It is contemplated that such a system would condense the scavenger out of the fluidizing medium in the recycle stream line. It would be preferred that the fluidizing medium is treated to remove the scavenger, see for example U.S. Pat. No. 4,460,755, incorporated herein by reference.

It is also contemplated by the process of the invention that scavenger can be intermittently introduced during the process wherein greater than 90%, preferably greater than 95% of all the scavenger introduced is removed from the recycle stream.

It is also contemplated by this invention that the catalyst or catalyst system or components thereof of the invention can be used upon start-up as a scavenger, however, this would be an expensive procedure.

In the most preferred embodiment of the invention the process is a gas phase polymerization process operating in a condensed mode. For the purposes of this patent specification and appended claims the process of purposefully introducing a recycle stream having a liquid and a gas phase into a reactor such that the weight percent of liquid based on the total weight of the recycle stream is greater than about 2.0 weight percent is defined to be operating a gas phase polymerization process in a "condensed mode".

In one embodiment of the process of the invention the weight percent of liquid in the recycle stream based on the total weight of the recycle stream is in the range of about 2 to about 50 weight percent, preferably greater than 10 weight percent and more preferably greater than 15 weight percent and even more preferably greater than 20 weight percent and most preferably in the range between about 20 and about 40 percent. However, any level of condensed can be used depending on the desired production rate.

In another embodiment of the process of the invention the amount of scavenger utilized if any is used should be in a mole ratio less than 100, preferably less than 50, more preferably less than about 25 based on the mole ratio of the metal of the transition metal scavenger to the transition metal of the metallocene where the scavenger is an aluminum containing organometallic compound and the transition metal of the metallocene is a Group 4 metal then the mole ratio above is based on the moles of aluminum to the moles of the Group 4 metal of the catalyst.

Fouling is a term used to describe the collection of polymer deposits on surfaces in a reactor. Fouling is detrimental to all parts of a polymerization process, including the reactor and its associated systems, hardware, etc. Fouling is especially disruptive in areas restricting gas flow or liquid flow. The two major areas of primary concern are the heat exchanger and distributor plate fouling. The heat exchanger consists of a series of small diameter tubes arranged in a tube bundle. The distributor plate is a solid plate containing numerous small diameter orifices through which the gas contained in a recycle stream is passed through before entering the reaction zone or distributed into a bed of solid polymer in a fluidized bed reactor such as described in U.S. Pat. No. 4,933,149, incorporated herein by reference.

Fouling manifests itself as an increase in the pressure drop across either the plate, cooler, or both. Once the pressure drop becomes too high, gas or liquid can no longer be circulated efficiently by the compressor, and it is often necessary to shut the reactor down. Cleaning out the reactor can take several days and is very time consuming and costly. Fouling can also occur in the recycle gas piping and compressor, but usually accompanies plate and cooler fouling.

Particle size is determined as follows; the particle size is measured by determining the weight of the material collected on a series of U.S. Standard sieves and determining the weight average particle size.

Fines are defined as the percentage of the total distribution passing through 120 mesh standard sieve.

In one embodiment, the process is operated using a metallocene catalyst based on bis(1,3-methyl-n-butyl cyclopentadienyl) zirconium dichloride is described in this example. It shows the fouling effect of operating a commercial reactor using TEAL. This example includes information from a startup of a commercial reactor on metallocene catalyst. Possible optimizations of the gas phase polymerization process and additional catalyst preparations are disclosed in U.S. Pat. Nos. 5,763,543, 6,087,291, and 5,712,352, and PCT published applications WO 00/02930 and WO 00/02931.

Although the VLPDE polymer component of the polymer blend compositions has been discussed as a single polymer, blends of two or more such VLDPE polymers, preferably two or more m-VLDPE polymers, having the properties described herein are also contemplated.

4.3 The LLDPE Component

The polymer blend compositions of the present invention may include a linear low density polyethylene (LLDPE) polymer. As used herein, the terms "linear low density polyethylene" polymer and "LLDPE" polymer refer to a homopolymer or preferably copolymer of ethylene having a density of from 0.916 to 0.940 g/cm$^3$. Polymers having more than two types of monomers, such as terpolymers, are also included within the term "copolymer" as used herein. The comonomers that are useful in general for making LLDPE copolymers include α-olefins, such as $C_3$–$C_{20}$ α-olefins and preferably $C_3$–$C_{12}$ α-olefins. The α-olefin comonomer can be linear or branched, and two or more comonomers can be used, if desired. Examples of suitable comonomers include linear $C_3$–$C_{12}$ α-olefins, and α-olefins having one or more $C_1$–$C_3$ alkyl branches, or an aryl group. Specific examples include propylene; 3-methyl-1-butene; 3,3-dimethyl-1-butene; 1-pentene; 1-pentene with one or more methyl, ethyl or propyl substituents; 1-hexene with one or more methyl, ethyl or propyl substituents; 1-heptene with one or more methyl, ethyl or propyl substituents; 1-octene with one or more methyl, ethyl or propyl substituents; 1-nonene with one or more methyl, ethyl or propyl substituents; ethyl, methyl or dimethyl-substituted 1-decene; 1-dodecene; and styrene. It should be appreciated that the list of comonomers above is merely exemplary, and is not intended to be limiting. Preferred comonomers include propylene, 1-butene, 1-pentene, 4-methyl-1-pentene, 1-hexene, 1-octene and styrene.

Other useful comonomers include polar vinyl, conjugated and non-conjugated dienes, acetylene and aldehyde monomers, which can be included in minor amounts in terpolymer compositions. Non-conjugated dienes useful as co-monomers preferably are straight chain, hydrocarbon di-olefins or cycloalkenyl-substituted alkenes, having 6 to 15 carbon atoms. Suitable non-conjugated dienes include, for example: (a) straight chain acyclic dienes, such as 1,4-hexadiene and 1,6-octadiene; (b) branched chain acyclic dienes; such as 5-methyl-1,4-hexadiene; 3,7-dimethyl-1,6-octadiene; and 3,7-dimethyl-1,7-octadiene; (c) single ring alicyclic dienes, such as 1,4-cyclohexadiene; 1,5-cyclo-octadiene and 1,7-cyclododecadiene; (d) multi-ring alicyclic fused and bridged ring dienes, such as tetrahydroindene; norbornadiene; methyl-tetrahydroindene; dicyclopentadiene (DCPD); bicyclo-(2.2.1)-hepta-2,5-diene; alkenyl, alkylidene, cycloalkenyl and cycloalkylidene norbornenes, such as 5-methylene-2-norbornene (MNB), 5-propenyl-2-norbornene, 5-isopropylidene-2-norbornene, 5-(4-cyclopentenyl)-2-norbornene, 5-cyclohexylidene-2-norbornene, and 5-vinyl-2-norbornene (VNB); and (e) cycloalkenyl-substituted alkenes, such as vinyl cyclohexene, allyl cyclohexene, vinyl cyclooctene, 4-vinyl cyclohexene, allyl cyclodecene, and vinyl cyclododecene. Of the non-conjugated dienes typically used, the preferred dienes are dicyclopentadiene, 1,4-hexadiene, 5-methylene-2-norbornene, 5-ethylidene-2-norbornene, and tetracyclo-(Δ-11,12)-5,8-dodecene. Particularly preferred diolefins are 5-ethylidene-2-norbornene (ENB), 1,4-hexadiene, dicyclopentadiene (DCPD), norbornadiene, and 5-vinyl-2-norbornene (VNB).

The amount of comonomer used will depend upon the desired density of the LLDPE polymer and the specific comonomers selected. One skilled in the art can readily determine the appropriate comonomer content appropriate to produce an LLDPE polymer having a desired density.

The LLDPE polymer has a density of 0.916 g/cm³ to 0.940 g/cm³, and preferably from 0.916 g/cm³ to 0.925 g/cm³. The LLDPE polymer can have a melt index of from 0.5 to 50 g/10 min (dg/min), as measured in accordance with ASTM-1238 condition E. Alternative lower limits for the melt index include 0.7 and 1.0 g/10 min, and alternative upper limits for the melt index include 5, 10, 12, 15 and 20 g/l0 min, with melt index ranges from any lower limit to any upper limit being within the scope of the invention.

The LLDPE polymer can be produced using any conventional polymerization process and suitable catalyst, such as a Ziegler-Natta catalyst or a metallocene catalyst. Metallocene-catalyzed LLDPEs (m-LLDPE) are preferred. Particularly preferred m-LLDPEs are the gas-phase, metallocene catalyzed LLDPEs described in WO 94/26816. Examples of suitable LLDPEs include the metallocene LLDPEs commercially available under the trade name EXCEED™ from ExxonMobil Chemical Co., Houston, Tex., the Ziegler-Natta LLDPEs available as ExxonMobil LL series LLDPEs, from ExxonMobil Chemical Co., Houston, Tex., and the DOWLEX™ LLDPE resins available from Dow Chemical Co.

Although the LLPDE polymer component of the polymer blend compositions has been discussed as a single polymer, blends of two or more such LLDPE polymers, preferably two or more metallocene-catalyzed LLDPE polymers, having the properties described herein are also contemplated.

4.3 Blends

In one embodiment, the present invention provides a polymer blend composition, the blend may include a PP polymer and an impact modifier of a VLDPE polymer or a LLDPE polymer. Preferably, the blend comprises a VLDPE polymer as an impact modifier. The blend may include any of the VLDPE polymers described herein, preferably a metallocene-catalyzed VLDPE polymer, and more preferably a gas-phase produced metallocene catalyzed VLDPE polymer. The blend may include any PP polymers, preferably a random PP copolymer. It has been found that articles made of a PP polymer and an impact modifier of a VLDPE or a LLDPE showed good impact resistance with good clarity.

The blends may be formed using conventional equipment and methods, such as by dry blending the individual components and subsequently melt mixing in a mixer, or by mixing the components together directly in a mixer, such as a Banbury mixer, a Haake mixer, a Brabender internal mixer, or a single or twin-screw extruder including a compounding extruder and a side-arm extruder used directly downstream of a polymerization process. Additionally, additives may be included in the blend, in one or more components of the blend, and/or in a product formed from the blend, such as an article or film, as desired. Such additives are well known in the art, and may include, for example: fillers; antioxidants (e.g., hindered phenolics such as IRGANOX™ 1010 or IRGANOX™ 1076 available from Ciba-Geigy); phosphites (e.g., IRGAFOS™ 168 available from Ciba-Geigy); anticling additives; tackifiers, such as polybutenes, terpene resins, aliphatic and aromatic hydrocarbon resins, alkali metal and glycerol stearates and hydrogenated resins; UV stabilizers; heat stabilizers; antiblocking agents; release agents; anti-static agents; pigments; colorants; dyes; waxes; silica; fillers; talc and the like.

The blends may include at least 5 weight percent and up to 85 weight percent of the impact modifier, preferably a VLDPE polymer, and at least 15 weight percent and up to 95 weight percent of the PP polymer, with these weight percents based on the total combined weight of the PP polymer and the impact modifier of the blend. Alternative lower limits of the impact modifier content, preferably a VLDPE polymer, may be 5%, 10%, or 15% by weight based on the total combined weight of the PP polymer and the impact modifier of the blend. Alternative upper limits of the impact modifier content, preferably a VLDPE polymer, may be 25%, 30%, 35% by weight based on the total combined weight of the PP polymer and the impact modifier of the blend. Ranges from any lower limit to any upper limit are within the scope of the invention.

In addition, the polymer blend composition may comprise virgin materials, regrind materials, or combinations thereof. In general, utilizing virgin materials in combination with regrind materials lowers the impact resistance and clarity of formed articles in comparison to utilizing virgin material alone.

4.4 Articles, Films, Coatings

One aspect of the invention relates to the formation of articles by blow-molding techniques, such as an extrusion blow-molding process or an injection molding process, from the polymer blend compositions discussed above. One example of a blow molding process comprises fitting a mold around the outside of a softened tubular structure comprising the polymer blend composition. In general, extrusion blow-molding utilizes an extruded tubular structure while injection blow-molding utilizes an injection molded tubular structure. The tube is heated, and, then, air is blown into the softened tube which forces the softened tube to conform to the inside walls of the mold. Once the polymer blend composition cools, the mold is opened and the newly molded article is removed. Blow molding is used to make many containers, such as detergent bottles, soft-drink bottles, jars, and storage drums.

One aspect of the polymer blend composition comprising an impact modifier as disclosed herein in the use of forming blow-molded containers without a significant loss of clarity is the low cost of impact modification, good processability (such as a good release from the mold and ease of trimming of flash), and the ability to add high levels of the impact modifier.

Another aspect of the invention relates to the formation of monolayer films from the polymer blend compositions discussed above. These films may be formed by any number of well known extrusion or coextrusion techniques discussed below. Films of the invention may be unoriented, uniaxially oriented or biaxially oriented. Physical properties of the film may vary depending on the film forming techniques used.

Another aspect of the invention relates to the formation of multilayer films from the polymer blend compositions discussed above. Multiple-layer films may be formed by methods well known in the art. The total thickness of multilayer films may vary based upon the application desired. A total film thickness of about 5–100 μm, more typically about 10–50 μm, is suitable for most applications. Those skilled in the art will appreciate that the thickness of individual layers for multilayer films may be adjusted based on desired end use performance, resin or copolymer employed, equipment capability and other factors. The materials forming each layer may be coextruded through a coextrusion feedblock and die assembly to yield a film with two or more layers adhered together but differing in composition. Coextrusion can be adapted for use in both cast film or blown film processes.

In one aspect, films containing the polymer., blend composition, monolayer or multilayer, may be formed by using casting techniques, such as a chill roll casting process. For example, a composition can be extruded in a molten state through a flat die and then cooled to form a film. As a specific example, cast films can be prepared using a pilot scale commercial cast film line machine as follows. Pellets of the polymer are melted at a temperature ranging from about 250° C. to about 300° C., with the specific melt temperature being chosen to match the melt viscosity of the particular resins. In the case of a multilayer cast film, the two or more different melts are conveyed to a coextrusion adapter that combines the two or more melt flows into a multilayer, coextruded structure. This layered flow is distributed through a single manifold film extrusion die to the desired width. The die gap opening is typically about 0.025 inches (about 600 μm). The material is then drawn down to the final gauge. The material draw down ratio is typically about 21:1 for 0.8 mil (20 μm) films. A vacuum box or air knife can be used to pin the melt exiting the die opening to a primary chill roll maintained at about 90° F. (32 C). The resulting polymer film is collected on a winder. The film thickness can be monitored by a gauge monitor, and the film can be edge trimmed by a trimmer. One or more optional treaters can be used to surface treat the film, if desired. Such chill roll casting processes and apparatus are well known in the art, and are described, for example, in The Wiley Encyclopedia of Packaging Technology, Second Edition, A. L. Brody and K. S. Marsh, Ed., John Wiley and Sons, Inc., New York (1997). Although chill roll casting is one example, other forms of casting can be used.

In another aspect, films containing the polymer blend composition, monolayer or multilayer, may be formed using blown techniques, i.e. to form a blown film. For example, the composition can be extruded in a molten state through an annular die and then blown and cooled to form a tubular, blown film, which can then be axially slit and unfolded to form a flat film. As a specific example, blown films can be prepared as follows. The polymer blend composition is introduced into the feed hopper of an extruder, such as a 63.5 mm Egan extruder that is water-cooled, resistance heated, and has an L/D ratio of 24:1. The film can be produced using a 15.24 cm Sano die with a 2.24 mm die gap, along with a Sano dual orifice non-rotating, non-adjustable air ring. The film is extruded through the die into a film that was cooled by blowing air onto the surface of the film. The film is drawn from the die typically forming a cylindrical film that is cooled, collapsed and optionally subjected to a desired auxiliary process, such as slitting, treating, sealing or printing. The finished film can be wound into rolls for later processing, or can be fed into a bag machine and converted into bags. A particular blown film process and apparatus suitable for forming films according to embodiments of the present invention is described in U.S. Pat. No. 5,569,693. Of course, other blown film forming methods can also be used.

In one embodiment, the polymer blend composition useful in forming a film, monolayer or multilayer, comprises a gas-phase metallocene-produced VLDPE having a melt index having the lower limits of 0.5 g/10 min or more, 0.7 g/10 min or more, 1 g/10 min or more and having the upper limits of 5 g/10 min or less, 3 g/10 min or less, or 2 g/10 min or less, with melt index ranges from any lower limit to any upper limit being within the scope of the invention.

Yet another aspect of the invention relates to an article formed by extrusion coating. For example, a substrate material can be contacted with the hot molten polymer blend composition as the polymer blend composition exits the die. For instance, an already formed polypropylene film may be extrusion coated with a blend polymer film as the latter is extruded through the die. Extrusion coatings are generally processed at higher temperatures than cast films, typically about 600° F., in order to promote adhesion of the extruded material to the substrate. Other extrusion coating processes are known in the art, including those described, for example, in U.S. Pat. Nos. 5,268,230, 5,178,960 and 5,387,630. In one embodiment, the present invention is directed to a blend polymer film or coating on a flexible substrate such as paper, metal foil or the like, wherein the film or coating is formed of a polymer blend composition. The coating may be a monolayer film or a multi-layer film. The substrate can also be stock for milk cartons, juice containers, films, etc. In one embodiment, the coating is formed of a blend comprising a gas-phase metallocene-produced VLDPE, the VLDPE having a melt index having the lower limits of 5 g/10 min or more, 7 g/10 min or more, 9 g/10 min or more, 13 g/10 min or more, 14 g/10 min or more, 15 g/10 min and having the upper limit of 20 g/l 0 min or less, with melt index ranges from any lower limit to the upper limit being within the scope of the invention.

The films and coatings of the present invention are also suitable for use in laminate structures; i.e., with a film or a coating as described herein disposed between two substrates. These films and coatings are also suitable for use as heat sealing or moisture barrier layers in single- or multi-layer structures.

In another aspect, the invention relates to any polymer product containing the polymer blend composition produced by methods known in the art. In addition to blow-molded containers as discussed above, this invention also includes products having other specific end-uses, such as film-based products, which include stretch films, bags (i.e. shipping sacks, trash bags and liners, industrial liners, and produce bags), flexible and food packaging (e.g., fresh cut produce packaging, frozen food packaging), personal care films pouches, medical film products (such as IV bags), diaper backsheets and housewrap. Products may also include packaging as bundling, packaging and unitizing a variety of products including various foodstuffs, rolls of carpet, liquid containers and various like goods normally containerized and/or palletized for shipping, storage, and/or display. Products may also include surface protection applications, with or without stretching, such as in the temporary protection of surfaces during manufacturing, transportation, etc. There are many potential applications of articles and films produced from the polymer blend compositions described herein.

5. EXAMPLES

Methods

Metallocene catalysts for the polymerization of the inventive VLDPE were prepared according to the methods as described above for an unbridged bis-Cp structure (such as bis(1,3-methyl-n-butyl cyclopentadienyl) zirconium dichloride).

The ACD protocol is an analytical-scale TREF (Temperature Rising Elution Fractionation) test for semi-crystalline copolymers to characterize the composition distribution (CD). A sample is dissolved in a good solvent, cooled slowly to allow crystallization on a support, and then re-dissolved and washed from the support by heating during elution. Polymer chains are fractionated by differences in their crystallization temperature in solution, which is a function of composition (and defect structure). A mass detector provides concentration vs. elution temperature data; CD characterization is obtained by applying a calibration curve (i.e., mole % comonomer vs. temperature) established using narrow-CD standards. Two in-house Visual Basic programs are used for data acquisition and analysis.

There are really two distributions provided by the ACD test:
- Solubility Distribution (weight fraction vs. solubility temperature)—measured directly.
- Composition Distribution (weight fraction vs. comonomer content)—obtained by applying the calibration curve to the solubility distribution.

Emphasis is usually placed on characterization of the CD. However, the solubility distribution can be of equal or greater importance when:
- A calibration curve has not been established for the polymer of interest.
- The MW of the sample is low, or the MWD is broad enough that a significant portion of the sample is low MW (M<20 k). Under these circumstances, the reported CD is influenced by the MW-dependence of solubility. The calibration curve must be corrected for the effect of MW to give the true CD, which requires a priori knowledge of the relative influence of MW and composition on solubility for a given sample. In contrast, the solubility distribution correctly accounts for contributions from both effects, without trying to separate them.

Note that the solubility distribution should depend on solvent type and crystallization/dissolution conditions. If correctly calibrated, the CD should be independent of changes in these experimental parameters.

Composition Distribution Breadth Index (CDBI) was measured using the following instrumentation: ACD: Modified Waters 150-C for TREF (Temperature: Rising Elution Fractionation) analysis (includes crystallization column, by-pass plumbing, timing and temperature controllers); Column: 75 micron glass bead packing in (High Pressure Liquid Chromatography) HPLC-type column; Coolant: Liquid Nitrogen; Software: "A-TREF" Visual Basic programs; and Detector: Polymer Laboratories ELS-1000. Run conditions for the CDBI measurements were as follows:

GPC Settings
  Mobile phase: TCE (tetrachlororethylene)
  Temperature: column compartment cycles 5–115° C., injector compartment at 115° C.
  Run time: 1 hr 30 min
  Equilibration time: 10 min (before each run)
  Flow rate: 2.5 mL/min
  Injection volume: 300 µL
Pressure settings: transducer adjusted to 0 when no flow, high pressure cut-off set to 30 bar
Temperature Controller Settings
  Initial Temperature: 115° C.
  Ramp 1 Temperature: 5° C. Ramp time=45 min Dwell time=3 min
  Ramp 2 Temperature: 115° C. Ramp time=30 min Dwell time=0 min
ELS Settings
  Nebulizer temperature: 120° C.
  Evaporator temperature: 135° C.
  Gas flow rate: 1.0 slm (standard liters per minute)
  Heated transfer line temperature: 120° C.

Example 1

Certain VLDPE polymer resins of the inventions herein were prepared using gas phase polymerization using metallocene catalyst systems as disclosed elsewhere herein. The invention resins are identified below in Table I as Samples A, G, H (EXCEED™ 321, 0.9129 g/cm$^3$), and 1. The co-monomers used to make Samples A, G, H, and I were ethylene and hexene. Fluidized gas phase reactors were operated to produce the resulting copolymers.

The polymerizations were conducted in the continuous gas phase fluidized bed reactors. The fluidized beds of those reactors were made up of polymer granules. The gaseous feed streams of ethylene and hydrogen were introduced below each reactor bed into the recycle gas line. Hexene comonomer was introduced below the reactor bed. An inert hydrocarbon (isopentane) was also introduced to each reactor in the recycle gas line, to provide additional heat capacity to the reactor recycle gases. The individual flow rates of ethylene, hydrogen and hexene comonomer were controlled to maintain fixed composition targets. The concentration of the gases were measured by an on-line gas chromatograph to ensure relatively constant composition in the recycle gas stream.

The solid catalyst was injected directly into the fluidized beds using purified nitrogen. The catalyst rates were adjusted to maintain constant production rate. The reacting beds of growing polymer particles were maintained in a fluidized state by a continuous flow of the make up feed and recycle gas through each reaction zone. To maintain constant reactor temperatures, the temperature of the recycle gas was continuously adjusted up or down to accommodate any changes in the rate of heat generation due to the polymerization.

The fluidized bed was maintained at a constant height by withdrawing a portion of the bed at a rate equal to the formation of the particulate product. The product was transferred to a purger vessel to remove entrained hydrocarbons.

Specifically, the properties of certain "invention" polymers, i.e., those made in accordance with the gas polymerization processes corresponding to the invention, using metallocene catalysts, were compared with certain "comparative" polymers, i.e., polymers made in accordance with non-invention methods.

Referring now to the comparative examples, Sample B was made using a comparative polymer, specifically, a linear low density polyethylene (EXCEED™ ECD-350D60, 0.9189 g/cm$^3$) made using metallocene catalyst in a gas phase polymerization process. Sample C was made, using a linear low density polyethylene (ExxonMobil LL-3001, 0.9199 g/cm$^3$) made using Ziegler-Natta catalyst in a gas phase polymerization process. Sample D was made using a plastomer (EXACT™ 3132, 0.9031 g/cm$^3$) made using metallocene catalyst in a high pressure bulk polymerization process. Sample E was made using a very low density polyethylene (Dow Attane 4201, 0.9132 g/cm$^3$) made using Ziegler-Natta catalyst in a solution polymerization process. Sample F was made using a very low density polyethylene (Dow Affinity 0.1840, 0.9104 g/cm$^3$) made using metallocene catalyst in a solution polymerization process. Sample J was made using a linear low density polyethylene (EXCEED™ ECD-320, 0.9178 g/cm$^3$) made using metallocene catalyst in a gas phase polymerization process. Sample K was made using a linear low density polyethylene (EXCEED™ ECD-350D60, 0.9183 g/cm$^3$) made using metallocene catalyst in a gas phase polymerization process.

The resin densities, melt index test results, and characterization data are set forth in Table 1 below. Comparative examples of samples B–F and J–K are denoted in the table by an asterisk (*).

TABLE I

| | | | | | | |
|---|---|---|---|---|---|---|
| Resin | A m-VLDPE | B* m-LLDPE (ECD-350D60) | C* ZN-LLDPE (LL-3001) | D* m-Plastomer (EXACT 3132) | E* ZN-VLDPE (Attane 4201) | F* m-VLDPE (Affinity 1840) |
| Density (g/cm³) | | | | | | |
| Molded | 0.9129 | 0.9189 | 0.9199 | 0.9031 | 0.9132 | 0.9104 |
| Rheology | | | | | | |
| MI (I2) | 1.07 | 1.17 | 1.10 | 1.09 | 1.00 | 0.96 |
| HLMI (I21) | 18.50 | 19.14 | 30.03 | 18.03 | 30.37 | 35.54 |
| Ratio (I21/I2) | 17.29 | 16.36 | 27.30 | 16.54 | 30.37 | 37.02 |
| MI Swell | 1.12 | 1.08 | 1.17 | 1.01 | 1.14 | 1.23 |
| Hexene Content | | | | | | |
| Wt % | 9.6 | 7.1 | | | | |
| GPC-HT | | | | | | |
| Mn | 50612 | 48653 | | | | |
| Mw | 100908 | 100064 | | | | |
| Mw/Mn | 1.99 | 2.06 | | | | |
| Mz/Mw | 1.66 | 1.69 | | | | |
| Mz + 1/Mw | 2.46 | 2.52 | | | | |
| ACD | | | | | | |
| CDBI | 64.5 | 6.7 | | | | |
| % Solubles | 0.6 | 0.6 | | | | |
| DSC (Celsius) | | | | | | |
| $2^{nd}$ melt-Peak | 118.34 | 120.70 | 124.56 | | 118.00 | 105.68 |
| $2^{nd}$ peak | 103.41 | 109.62 | | 99.64 | 123.25 | |
| $3^{rd}$ peak | | | | | 103.62 | |
| Delta H (J/g) | 112.06 | 126.96 | 128.45 | 94.76 | 112.45 | 108.61 |
| Crystallization-Peak | | | | | | |
| $2^{nd}$ peak | | | | | | |
| $3^{rd}$ peak | | | | | | |
| Delta H (J/g) | −118.11 | −129.63 | −130.28 | −96.17 | −114.28 | −114.41 |

| | | | | | |
|---|---|---|---|---|---|
| Resin | G m-VLDPE | H m-VLDPE (ECD-321) | I m-VLDPE | J* m-LLDPE (ECD-320) | K* m-LLDPE (ECD-350D60) |
| Density (g/cm³) | | | | | |
| Molded | 0.9114 | 0.9129 | 0.9130 | 0.9178 | 0.9183 |
| Rheology | | | | | |
| MI (I2) | 0.97 | 1.17 | 1.07 | 1.14 | 1.12 |
| HLMI (I21) | 17.04 | 18.18 | 17.39 | 18.13 | 17.41 |
| Ratio (I21/I2) | 17.56 | 15.5 | 16.3 | 15.9 | 15.6 |
| MI Swell | 1.10 | 1.13 | 1.13 | 1.12 | 1.13 |
| Hexene Content | | | | | |
| Wt % | 10.2 | 10.4 | 10.0 | 8.2 | 7.2 |
| GPC-HT | | | | | |
| Mn | 52016 | 45411 | 44528 | 44050 | 46928 |
| Mw | 102647 | 101795 | 103827 | 103123 | 103842 |
| Mw/Mn | 1.97 | 2.24 | 2.33 | 2.34 | 2.21 |
| Mz/Mw | 1.61 | 1.73 | 1.75 | 1.74 | 1.73 |
| Mz + 1/Mw | 2.29 | 2.66 | 2.71 | 2.65 | 2.66 |
| ACD | | | | | |
| CDBI | 55.3 | 71.8 | 66.4 | 62.5 | 72.7 |
| % Solubles | 1.1 | 1.2 | 1.2 | 1.7 | 2.3 |
| DSC (Celsius) | | | | | |
| $2^{nd}$ melt-Peak | 117.83 | 116.50 | 116.07 | 119.37 | 118.03 |
| $2^{nd}$ peak | 101.72 | 100.81 | 100.43 | 106.36 | 107.76 |

TABLE I-continued

| Resin Properties | | | | | |
|---|---|---|---|---|---|
| 3rd peak Delta H (J/g) | 109.84 | 113.44 | 122.44 | 131.67 | 132.32 |
| Crystallization-Peak | | 102.37 | 102.76 | 105.33 | 103.27 |
| 2nd peak | | 89.42 | 89.96 | 94.87 | 94.51 |
| 3rd peak | | 60.58 | 61.33 | 64.74 | 66.16 |
| Delta H (J/g) | −112.19 | −121.36 | −122.46 | −132.01 | −130.65 |

Examples 2–8

Blow-molded containers were made using certain embodiments of the polymer blend compositions of the present invention. The containers comprised bottles adapted to hold a volume of 90 fluid ounces and weighing 115 grams. In Example 2, blow-molded containers were formed from a blend of 90% by weight random polypropylene copolymer and 10% by weight metallocene gas-phase polymerized VLDPE (I melt index, 0.912 g/cm$^3$ density). In Example 3 and Example 4, blow-molded containers were formed from a blend of 80% by weight random polypropylene copolymer and 20%, by weight metallocene gas phase polymerized VLDPE (1 melt index, 0.912 g/cm$^3$ density).

As comparative examples, blow-molded containers were made using other blends. The containers comprised bottles adapted to hold a volume of 90 fluid ounces and weighing 115 grams. In Example 5 and Example 6, blow-molded containers were formed from a blend of 90% by weight random polypropylene copolymer and 10% by weight plastomer (EXACT® 0201, 1.1 melt index, 0.902 g/cm$^3$ density). In Example 7, blow-molded containers were formed from a blend of 90% by weight random polypropylene copolymer and 10% by weight plastomer (EXACT®8201, 1.1 melt index, 0.882 g/cm$^3$ density). In Example 8, blow-molded containers were formed from a blend of 90% by weight random polypropylene copolymer and 10% by weight plastomer (EXACT®)4033, 0.8 melt index, 0.880 g/cm$^3$ density). EXACT® plastomers are available from ExxonMobil Chemical Co., Houston, Tex.

Due to the trimming and cutting limitations of the blow-molding machine in forming the handles of the containers, blow-molded containers made of a blend of a plastomer with a polypropylene were limited to blends having a plastomer content of 10% by weight or lower. Forming blow-molded containers made of a blend of a VLDPE with polypropylene having a VLDPE contents of 10% by weight and above or 20% by weight and above were possible. Thus, the polymer blend composition comprising VLDPE as an impact modifier showed improved processing characteristics in the making of blow-molded containers in comparison to the use of a plastomer as an impact modifier. The blow-molded containers comprising a VLDPE as an impact modifier showed an improved release from the mold and improved trimming during flash than blow-molded containers comprising a plastomer as an impact modifier. Because of the improved processing characteristics, higher levels of VLDPE as an impact modifier were able to be used than when a plastomer was used an impact modifier.

Based on a visual inspection of the blow-molded containers of Example 2 and Examples 5–8, the blow-molded containers of Example 2 having a VLDPE content of 10% by weight showed unexpected good clarity in comparison with Examples 5–8 having a plastomer content of 10% by weight. The blow-molded containers of Examples 3–4 having a VLDPE content of 20% by weight showed unexpected good clarity with a slight reduction in clarity in comparison to the blow-molded containers of Example 1 having a VLDPE content of 10% by weight.

Bruceton Drop Tests were conducted on the blow-molded containers formed in Examples 2–8, the results of which are shown in Table II. The Bruceton Drop Test results were determined according to ASTM D-2463-95, Procedure B. Generally, the Bruceton Drop Test provides an indication of the drop impact resistance of blow-molded thermoplastic containers. For each example, a set of 20 containers comprising the polymer blend composition were filled with 40° F. (6° C.) water and then refrigerated at 40° F. for either 7 days or 30 days. Then, the set of containers were dropped from various heights, the drop height being raised or lowered depending on the results obtained on the specimen most recently tested. The Bruceton Mean Drop Height is the mean drop height of the containers which failed.

Example 2 comprising a 10% VLDPE with a random polypropylene exhibited a similar Bruceton Mean Drop Height in comparison to Examples 5–6; Example 2 exhibited a higher Bruceton Mean Drop Height in comparison to Example 7; and Example 2 exhibited a lower Bruceton Mean Drop Height in comparison to Example 8. Example 3 and Example 4 comprising a 20% VLDPE with a random polypropylene copolymer showed an unexpected higher Bruceton Mean Drop Height in comparison to Examples 5–8 comprising a blend of a plastomer with a random polypropylene copolymer. In addition, as shown by Example, 3 and Example 4, there was no significant degradation of the impact strength properties of containers comprising a 20% VLDPE with a random polypropylene copolymer stored for 7 days and those stored for 30 days.

TABLE II

| | Impact Modifier | Wt. % | Days Stored | Bruceton Mean Drop Height, ft (m) | Breakage Area |
|---|---|---|---|---|---|
| Example 2 | VLDPE | 10% | 7 | 3.8 ft (1.16 m) | 7/7 complete bottle failures |

TABLE II-continued

| | Impact Modifier | Wt. % | Days Stored | Bruceton Mean Drop Height, ft (m) | Breakage Area |
|---|---|---|---|---|---|
| Example 3 | VLDPE | 20% | 7 | 4.8 ft (1.46 m) | 3/7 complete bottle failures 4/7 label panel fractures |
| Example 4 | VLDPE | 20% | 30 | 4.8 ft (1.46 m) | 3/7 complete bottle failures 4/7 label panel fractures |
| Comparative Example 5 | Plastomer (Exact 0201) | 10% | 7 | 3.9 ft (1.19 m) | 4/8 complete bottle failures 4/8 large label panel fractures |
| Comparative Example 6 | Plastomer (Exact 0201) | 10% | 30 | 3.7 ft (1.13 m) | 4/8 complete bottle failures 4/8 large label panel fractures |
| Comparative Example 7 | Plastomer (Exact 8201) | 10% | 7 | 3.0 feet (0.91 m) | 1/8 complete bottle failures most others 1–22 inch bottom breaks |
| Comparative Example 8 | Plastomer (Exact 4033) | 10% | 7 | 4.3 feet (1.31 m) | 4/7 complete bottle failures 3/7 large label panel fractures |

Examples 9–12

A set of blow-molded containers were made using certain embodiments of the polymer blend compositions of the present invention. The containers comprised bottles adapted to hold a volume of about 2 liters and weighing approximately 90 grams. In Example 9, blow-molded containers were formed from a blend of 85% by weight random polypropylene copolymer and 15% by weight metallocene gas-phase polymerized VLDPE (1 melt index, 0.912 g/cm$^3$ density). In Example 10, blow-molded containers were formed from a blend of 80% by weight random polypropylene copolymer and 20% by weight metallocene gas-phase polymerized VLDPE (1 melt index, 0.912 g/cm$^3$ density). Commercial examples of metallocene gas-phase polymerized VLDPE include EXCEED® and are available from ExxonMobil Chemical Co., Houston, Tex.

As comparative examples, blow-molded containers were made using other blends. The containers comprised bottles adapted to hold a volume of approximately 2 liters and weighing approximately 90 grams. In Comparative Example 11 and Example 12, blow-molded containers were formed from a blend of 85% by weight random polypropylene copolymer and 15% by weight plastomer (EXACT® 0201, 1.1 melt index, 0.902 g/cm$^3$ density). EXACT® plastomers are available from ExxonMobil Chemical Co., Houston, Tex.

Column Crush Properties of Blown Thermoplastic Containers tests, also known as top load tests, were conducted on the blow-molded containers formed in Examples 9–12, the results of which are shown in Table III. The results were determined according to ASTM D 2659-95. Generally, this test method covers the determination of mechanical properties of blown thermoplastic containers when loaded under columnar crush conditions at a constant rate of compressive deflection. For each example, a set of 20 containers made of the polymer blend compositions were placed between the members of a testing machine. Then, the movable member of the testing machine was adjusted until it contacted the top of the container. Subsequently, each container was crushed and crush loads and corresponding deflection at appropriate intervals of deflection were recorded. Deflection at Crushing Yield Load was determined for each example by observing the decrease in length produced in gage length of the container at the crushing yield load. The results were expressed in pounds per quarter inch.

Example 9 made with 15% VLDPE and a random polypropylene copolymer exhibited a higher top load and greater stiffness in comparison to Examples 11–12 made with 15%, plastomer and random polypropylene copolymer.

Bruceton Drop Tests were conducted on the blow-molded containers formed in Examples 9–12, the results of which are shown in Table III. The Bruceton Drop Test results were determined as described above according to ASTM D-2463-95.

Example, 9 made with 15% VLDPE and a random polypropylene copolymer exhibited a favorable Bruceton Mean Drop Height despite its lower value as compared to Examples 11–12 made with 15% plastomer and random polypropylene copolymer.

Haze tests were conducted on the blow-molded containers formed in Examples 9–12, the results of which are shown in Table III. The results were determined according to ASTM D 1003 Procedure A. Generally, this test method covers the evaluation of specific light-transmitting and wide-angle-light-scattering properties of planar sections of materials such at essentially transparent plastic. Haze is the percent of transmitted light that is scattered so that its direction deviates more than a specified angle from the direction of the incident beam. For each example, three specimens were obtained from the examples and fashioned in accordance with ASTM D 1003. Then, haze values were recorded according to Procedure A and with the use of a hazemeter.

Example 9 made with 15% VLDPE and a random polypropylene copolymer exhibited greater haze in comparison to Examples 11–12 made with 15% plastomer and random polypropylene copolymer. Nevertheless, Example 9 exhibits very good haze for one of the embodiment's intended purpose, packaging products in blow-molded bottles.

TABLE III

| | Impact Modifier | Wt. % | Top Load Performance (lb/.25 in) | Bruceton Mean Drop Height (ft) | Optical Performance (%) |
|---|---|---|---|---|---|
| Example 9 | VLDPE | 15 | 138 | 6.8 | 37 |
| Example 10 | VLDPE | 20 | — | — | — |
| Comparative Example 11 | Plastomer (Exact™ 0201) | 15 | 128 | 7.8 | 24 |

TABLE III-continued

| | Impact Modifier | Wt. % | Top Load Performance (lb/.25 in) | Bruceton Mean Drop Height (ft) | Optical Performance (%) |
|---|---|---|---|---|---|
| Comparative Example 12 | Plastomer (Exact™ 0201) | 15 | 128 | 7.8 | 24 |

All patents, test procedures, and other documents cited herein, including priority documents, are fully incorporated by reference to the extent such disclosure is not inconsistent with this invention and for all jurisdictions in which such incorporation is permitted.

While the foregoing discussion is directed to certain examples, versions and preferred embodiments of the present invention, other and further embodiments of the invention may be devised without departing from the basic scope thereof, and the scope of each invention disclosed herein is determined by the claims that follow, including their equivalents.

What is claimed is:

1. A polymer blend composition comprising:
   (a) a metallocene-catalyzed linear very low density polyethylene polymer having:
      (i) a density of 0.890 to 0.916 cm³,
      (ii) a composition distribution breadth index of 50 to 85% by weight,
      (iii) a molecular weight distribution Mw/Mn of 2.0 to 3.0,
      (iv) a molecular weight distribution Mz/Mw of less than 2.0, and
      (v) two peaks in a TREF measurement; and
   (b) a random polypropylene polymer;
   wherein the blend comprises 5% to 85% of the very low density polyethylene polymer and 95% to 15% of the polypropylene polymer, based on the total combined weight of the polypropylene polymer and the very low density polyethylene polymer.

2. The composition of claim 1, wherein the very low density polyethylene polymer is a gas-phase metallocene produced very low density polyethylene polymer.

3. The composition of claim 1, wherein the very low density polyethylene polymer has a density of from 0.900 to 0.915 g/cm³.

4. The composition of claim 1, wherein the very low density polyethylene polymer has a density of from 0.905 to 0.915 g/cm³.

5. The composition of claim 1, wherein the very low density polyethylene polymer has a density of from 0.910 to 0.915 g/cm³.

6. The composition of claim 1, wherein the very low density polyethylene polymer has a melt index of from 0.5 to 50 g/10 min.

7. The composition of claim 1, wherein the polypropylene polymer has a melt flow rate of from 0.5 to 200 g/10 min.

8. The composition of claim 1, wherein the polypropylene polymer has a molecular weight distribution index of 1.5 to 10.

9. The composition of claim 1, wherein the very low density polyethylene polymer is a comonomer of ethylene and at least one comonomer selected from the group consisting of $C_3$ to $C_{12}$ alpha olefins.

10. The composition of claim 1, wherein the very low density polyethylene polymer is a comonomer of ethylene and at least one comonomer selected from the group consisting of 1-butene, 1-hexene and 1-octene.

11. The composition of claim 1, wherein the very low density polyethylene polymer is a comonomer of ethylene and 1-hexene.

12. The composition of claim 1, wherein the very low density polyethylene polymer has a composition distribution breadth index of 60 to 80%.

13. The composition of claim 1 wherein the very low density polyethylene polymer has a composition distribution breadth index of 55 to 75%.

14. The composition of claim 1, wherein the very low density polyethylene polymer has a molecular weight distribution Mw/Mn of 2.2 to 2.8.

15. The composition of claim 1, wherein the blend comprises 5% to 35% of the very low density polyethylene polymer and 95% to 65% of the polypropylene polymer, based on the total combined weight of the polypropylene polymer and the very low density polyethylene polymer.

16. The composition of claim 1, wherein the blend comprises 10% to 30% of the very low density polyethylene polymer and 90% to 70% of the polypropylene polymer, based on the total combined weight of the polypropylene polymer and the very low density polyethylene polymer.

17. The composition of claim 1, wherein the blend comprises 15% to 25% of the very low density polyethylene polymer and 85% to 75% of the polypropylene polymer, based on the total combined weight of the polypropylene polymer and the very low density polyethylene polymer.

18. An article comprising the polymer blend of claim 1.

19. The article of claim 18, wherein the article is a blow-molded container.

20. The article of claim 18, wherein the article is a blow-molded container having a Bruceton Mean Drop Height of at least 3 feet.

21. The article of claim 20, wherein the Bruceton Mean Drop Height is at least 3.8 feet.

22. The article of claim 20, wherein the Bruceton Mean Drop Height is at least 4.8 feet.

23. The article of claim 19, wherein the blow-molded container has a volume of at least 60 fluid ounces.

24. A polymer blend composition comprising:
   (a) a metallocene-catalyzed linear very low density polyethylene polymer having:
      (i) a density of 0.890 to 0.916 g/cm₃,
      (ii) a composition distribution breadth index of 55 to 75% by weight,
      (iii) a molecular weight distribution Mw/Mn of 2.0 to 3.0,
      (iv) a molecular weight distribution Mz/Mw of less than 2.0, and
      (v) two peaks in a TREE measurement; and
   (b) a random polypropylene polymer;
   wherein the blend comprises 5% to 85% of the very low density polyethylene polymer and 95% to 15% of the polypropylene polymer, based on the total combined weight of the polypropylene polymer and the very low density polyethylene polymer and wherein the metallocene catalyst is selected from the group consisting of: $\mu$-$(CH_3)_2$Si(indenyl)$_2$M$(CH_3)_2$; $\mu$-$(CH^3)_2$Si (tetrahydroindenyl)$_2$M$(CH)_2$; $\mu$-$(CH_3)_2$Si (tetrahydroindenyl)$_2$M$(CH_3)_2$; $\mu$-$(CH_3)_2$Si (indenyl)$_2$M$(CH_2CH_3)_2$; and $\mu$-$(C_6H_5)2C$(indenyl)$2M(CH_3)_2$, where M is Zr or Hf.

* * * * *